(12) United States Patent
Sasaki et al.

(10) Patent No.: US 6,772,990 B2
(45) Date of Patent: Aug. 10, 2004

(54) CAPACITY CONTROL VALVE

(75) Inventors: Sinji Sasaki, Takahashi (JP); Keigo Shirahuji, Takahashi (JP); Toshiaki Iwa, Takahashi (JP); Ryousuke Cho, Takahashi (JP); Yoshihiro Ogawa, Takahashi (JP); Katsuya Shirai, Takahashi (JP); Takahiro Maeda, Takahashi (JP); Norio Uemura, Takahashi (JP)

(73) Assignee: Eagle Industry Co., Ltd., Tokyo (JP)

( * ) Notice: Subject to any disclaimer, the term of this patent is extended or adjusted under 35 U.S.C. 154(b) by 0 days.

(21) Appl. No.: 10/355,071

(22) Filed: Jan. 31, 2003

(65) Prior Publication Data

US 2003/0145615 A1 Aug. 7, 2003

(30) Foreign Application Priority Data

Feb. 4, 2002 (JP) ...................................... 2002-027435
Feb. 27, 2002 (JP) ...................................... 2002-051120
Aug. 23, 2002 (JP) ...................................... 2002-244198

(51) Int. Cl.[7] .......................... F04B 49/00; F04B 27/08
(52) U.S. Cl. ................................ 251/129.03; 62/228.3; 417/222.2; 137/625.17
(58) Field of Search .............................. 62/228.3, 228.5; 417/222.2; 251/129.03; 137/625.17

(56) References Cited

U.S. PATENT DOCUMENTS 6,457,319 B1 * 10/2002 Ota et al. ................... 62/228.5
6,481,976 B2 * 11/2002 Kimura et al. ............ 417/222.2
6,514,049 B2 * 2/2003 Mera et al. ................ 417/222.2

FOREIGN PATENT DOCUMENTS

| EP | 0 945 617 A2 | 9/1999 |
| EP | 0 945 617 A3 | 2/2000 |

OTHER PUBLICATIONS

European Office Action dated Feb. 19, 2004.

* cited by examiner

Primary Examiner—Harry B. Tanner
(74) Attorney, Agent, or Firm—Arent Fox PLLC

(57) ABSTRACT

A capacity control valve that implements an accurate pressure control of a valve body by preventing unwanted pressures from influencing on the valve body and that alters the function of a control chamber such that the pressure within the control chamber to which a control pressure is supplied can quickly be modulated. In the capacity control valve, a valve opening joint portion which is integral with a valve body can rapidly be disengaged from an engagement portion which is integral with a pressure sensing device, hence a quick lifting of the valve body so as to modulate the capacity or pressure in the control chamber. Also equating, exactly or approximately, the seal pressure receiving area of the valve body to the effective pressure receiving area of the pressure sensing device, and further to the pressure receiving area of an action face, or equating, exactly or approximately, the seal pressure receiving area to the pressure receiving area of an action face, yields only a desired pressure to act on the valve body.

15 Claims, 15 Drawing Sheets

Status of valve-closed

CAPACITY CONTROL VALVE

BACKGROUND OF THE INVENTION

1. Field of the Invention

The present invention relates generally to a capacity control valve for variably modulating the capacity or pressure of a process fluid. More particularly, the invention relates to a capacity control valve which modulates the capacity or pressure in a control chamber of an air-conditioning system in a quick manner.

2. Description of the Related Art

There have been known as a relative art of the present invention capacity control valves for a variable displacement type swash plate compressor in an air-conditioning system. The relative art of the capacity control valve is illustrated in FIG. 15.

In FIG. 15, a pressure sensing element 210 is disposed in a suction chamber 206 which is located at the lower end of a capacity control valve 200. The pressure sensing element 210 is formed by a resilient bellows with a biasing spring which is disposed inside the bellows and the element is constructed in such a way that the upper end of the element moves by a contraction due to a suction pressure Ps supplied from an external. At the upper end of the pressure sensing element 210, an intermediate rod 207 is disposed in a guide passage of a housing 220 in an axially movable manner. Furthermore, a valve body 201 connected to the intermediate rod 207 is disposed in a valve hole 208, as shown in FIG. 15, at the upper portion of the housing 220. Opening or closing motion of the valve body 201 corresponds to a separation or contact, respectively, of the valve body with the valve seat of the valve hole 208, and hence an opening or closing of the valve hole 208, respectively.

The housing 220 constitutes Ps supply port, Pd discharge port, and Pc crank chamber supply port wherein the Pd discharge port is connected to the valve hole 208 by means of a through communication passage 209. When the valve hole 208 opens, the valve hole 208 is directly connected to the Pc crank chamber supply port and a process fluid is allowed to a crank chamber which is not shown in FIG. 15.

Opening or closing of the valve body 201 is modulated by changing the set supply pressure (Ps set value) of the pressure sensing element 210 in accordance with the generated force of an electromagnetic solenoid coil device 202 which is disposed in the upper end portion of the capacity control valve 200, and a capacity control of the variable displacement compressor is achieved by modulating the crank pressure Pc of the crank chamber while controlling the flow under the discharge pressure Pd guided to the crank chamber of the variable displacement compressor in accordance with an opening degree of the valve body 201.

The pressure sensing element 210 disposed in the suction chamber 206 has a load characteristic such that the element expands or contracts in accordance with the suction pressure Ps within the normal use range of the suction pressure Ps.

When no electric current is supplied to the electromagnetic solenoid coil device 202, the valve body 201 is maintained at a fully open position by the urging spring force of a return spring 203. This fully opened position corresponds to a fully unloaded state. When the current is supplied to the solenoid coil device 202, an electromagnetic attractive force is generated between a plunger 40 and a fixed iron core 205. The valve body 201 maintains its fully opened position, namely an insensitive zone, until the electromagnetic force becomes larger than the opposing urging force of the return spring 203.

However, when the electromagnetic force becomes larger than the urging force of the return spring 203, the valve body 2011 moves in a direction closing the valve, entering Ps control range in which the more the coil current supply, the larger the valve closing force, and the lower the Ps set value.

In this type of capacity control valve 200, it is difficult to reduce a cooling load because, in case of a great cooling load, the valve quickly closes due to the suction pressure Ps. Consequently, the compressor has to be stopped by means of clutch and the air-conditioning system needs to be turned off.

Diameter of the connected rod varies in place, and when the pressure areas of the rod are subjected to the suction pressure Ps, discharge pressure Pd, or crank chamber supply pressure Pc, the balance of the forces acting on the operation mechanism of the rods including the valve body (according to the ratio of the pressure receiving area of the respective rod diameters) causes substantially a bad influence on the valve opening degree of the valve body 201.

Furthermore, a variation in the crank pressure Pc due to the different operation modes of a compressor may cause uncontrollable disturbances to the suction pressure Pc. Therefore, an accurate current control to the electromagnetic solenoid coil does not help improve the capacity control precision of the valve according to a preset suction pressure Ps.

A connection rod between the pressure sensing element 210 and the fixed iron core 205 comprises an intermediate rod 207, a valve body rod 201A, and a plunger rod 204A. In the connection rod, a wear of the joint portion of each rod causes a serious problem of the valve opening degree of the valve body 202.

Performance of the connection rod between the pressure sensing element 210 and the valve body 201 is worsened with respect to the opening degree of the valve body 201 because a wear of the contact surface causes the total length of the connection rod to be shortened since each joint is formed by a simple contact of the two adjacent rods.

This type of capacity control valve for variable displacement compressors suffers from the following problems due to the above mentioned arrangements. Primarily, the capacity control valve does not allow a quick change in the pressure of the control chamber. Therefore, such a variable displacement compressor, for instance, will require a clutch, which may result in a cost increase due to the more complicated structure of the variable displacement compressor.

Since no consideration is given in terms of the force balance which is affected by the pressure areas of the valve body, valve body rod, intermediate rod, and so on, to each of which the process fluid exerts a corresponding pressure, it is hard to maintain the control accuracy of the capacity or pressure of the process fluid under the control pressure.

Furthermore, the valve operation in which the valve body, valve body rod, intermediate rod and so on, are individually connected may cause a decrease in accuracy of the valve opening or closing action due to wears of the joint portions.

The present invention is introduced to resolve the above mentioned problems. A primary technical goal which this invention tries to achieve is to realize an accurate control of the pressure or the capacity of the capacity control valve without being affected by other pressures, and to be able to modify the pressure or the capacity of the capacity control valve as soon as an operation load exceeds a predetermined value. For example, when a clutch is needed for a variable displacement compressor, this invention eliminates such a clutch from the compressor and reduces the extra cost to install a clutch in the variable displacement compressor.

Another goal is to obtain a capacity control valve wherein the force balance acting on the operation mechanism of the connection rod including the valve body is arbitrarily chosen and the capacity or the pressure in the control chamber is accurately controlled based on a predetermined suction pressure (Pset) without being affected by other pressures.

For example, when the capacity control valve is used in a variable displacement compressor which is controlled by the suction pressure Ps, this invention enables the compressor to implement an accurate control with the predetermined suction pressure (Ps) without being affected by the crank chamber pressure (Pc) or the discharge pressure (Pd).

A further goal is to increase a manufacturing precision and to reduce a production cost by constructing one integral piece of a pressure sensing rod.

Yet another goal is to simplify the assembly process of the pressure sensing rod, the pressure sensing device and the valve housing, and also to improve the operation of the pressure sensing rod wherein the pressure sensing rod and the pressure sensing device are connected before being assembled with the valve housing.

SUMMARY OF THE INVENTION

A primary object of the present invention is to resolve the above mentioned technical problems, and a solution to such problems is embodied as follows.

A preferred embodiment of a capacity control valve constructed in accordance with the principles of the present invention is a capacity control valve for controlling the opening area of a valve portion for modulating the capacity or pressure within a control chamber by means of a control pressure fluid, the capacity control valve comprising a capacity chamber, a valve chamber, an action chamber, an action face, a valve body, a valve opening joint portion, an engagement portion, a pressure sensing device and a solenoid portion, the capacity chamber being located in the valve portion and connected with a second communication passage, the valve chamber having a valve seat for a valve hole connected with the capacity chamber and connected with a first communication passage, the operation chamber being connected with the valve chamber and also connected with a detection communication passage, the action face being disposed inside the action chamber and having a pressure receiving area which receives a suction pressure via the detection communication passage, the valve body being integral with the action face and located in the valve chamber in a freely movable manner and having a valve surface which can be freely attached to or detached from the valve seat, the valve opening joint portion being integral with the valve body and having a pressure receiving surface, the engagement portion making a contact with the pressure surface of the valve opening joint portion and being disengaged from the pressure receiving surface when the valve body opens, the pressure sensing device retaining the engagement portion, being located inside the capacity chamber and urging the valve body to open by receiving the process fluid pressure within the capacity chamber, the solenoid portion driving a plunger which has a solenoid rod connected with the valve body in an opening or closing direction of the valve body.

The most preferred embodiment of the present invention is a capacity control valve with an ability of rapidly changing the pressure of a control chamber when a suction pressure Ps is used to modulate a control pressure. For example, there is a necessary case wherein a solenoid current needs to be shut off so as to change a set value during the operation. A capacity control valve in accordance with the present invention is capable of dealing with this kind of situation. More specifically, while the valve is in action, the valve body not only can achieve an accurate capacity control or pressure control by means of Ps under a normal operation, but also, in case of an increased fluid pressure load to be controlled, can quickly open the valve by disengaging the valve opening joint portion from the engagement portion which is connected to the solenoid portion according to commands supplied from the external.

The valve opening joint portion is located between the pressure sensing device and the valve body and, when the valve body is in operation, the valve opening degree is determine by the contact of the valve opening joint portion and the engagement portion according to the force balance among the force given by the solenoid coil according to the current supplied to the solenoid, the force given by the pressure sensing device acted on by the process fluid pressure, and the forces acted on respective faces of the valve body. Under this circumstance, the engagement portion and the valve opening joint portion act together while the sliding surfaces of the engagement portion and the valve opening joint portion maintain a contact. The contact surfaces of the engagement portion and the valve opening joint portion located in the capacity chamber merely form a slidable contact when the valve body quickly opens based on the command given to the solenoid portion by a computer controller which is not shown in the figure, and therefore a relative movement of the valve opening joint portion in a direction opening the valve can be easily transmitted by the engagement portion. As a consequence, a quick opening of the valve body induces the controlled process fluid to quickly discharge to the control chamber, and thus a modulation of the capacityw or pressure value within the control chamber to a desired value will be made possible.

DETAILED DESCRIPTION OF THE INVENTION

Described below is details of the figures of preferred embodiments of a capacity control valve constructed in accordance with the principles of the present invention. All the figures explained below are constructed according to actual design drawings with accurate dimensional relations.

Figure 1:
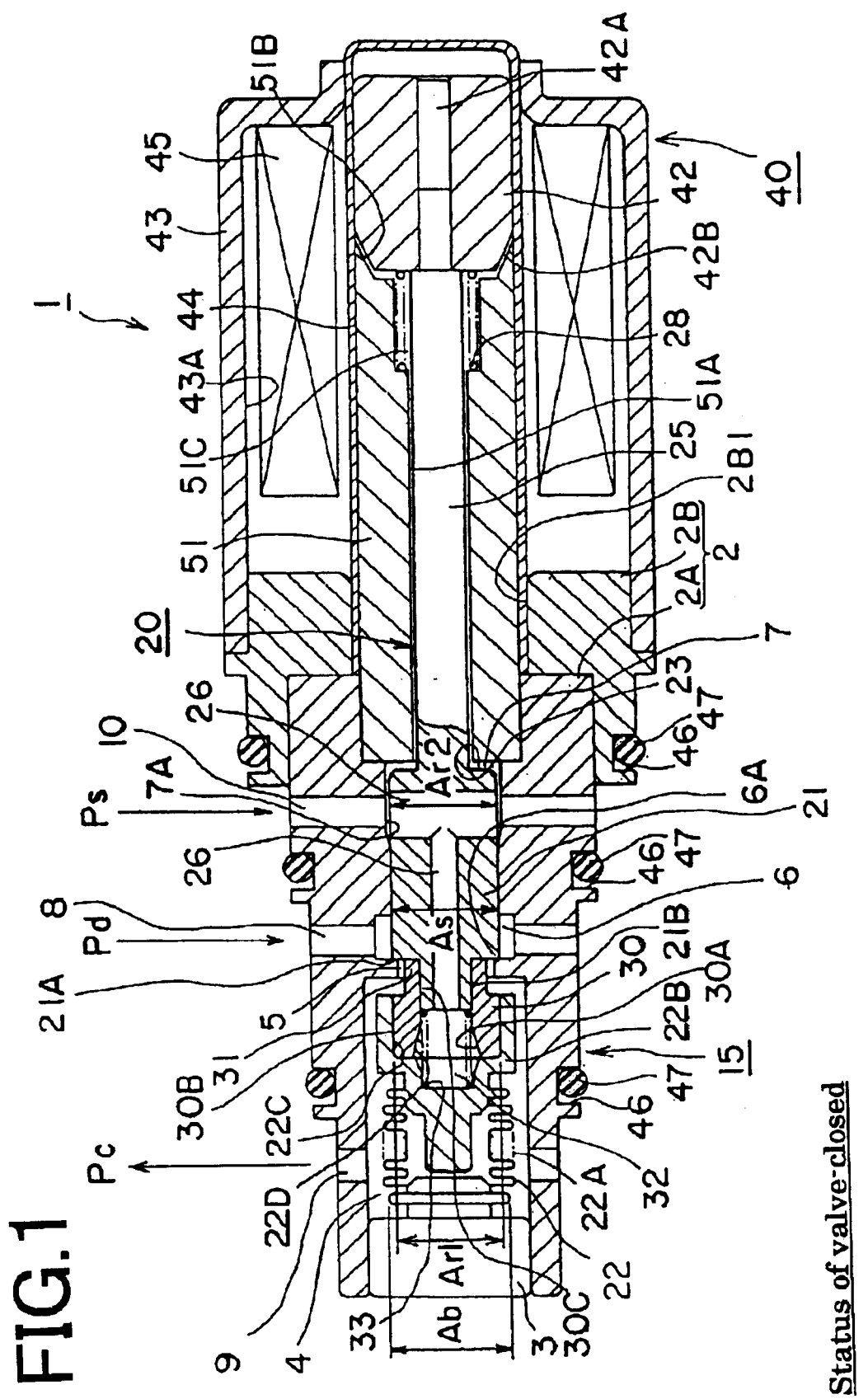
FIG. 1 is a cross sectional view of a capacity control valve as a first preferred embodiment relative to the present invention.

FIG. 1 shows a cross sectional view of a capacity control valve according to a first embodiment of the present invention.

Figure 2:
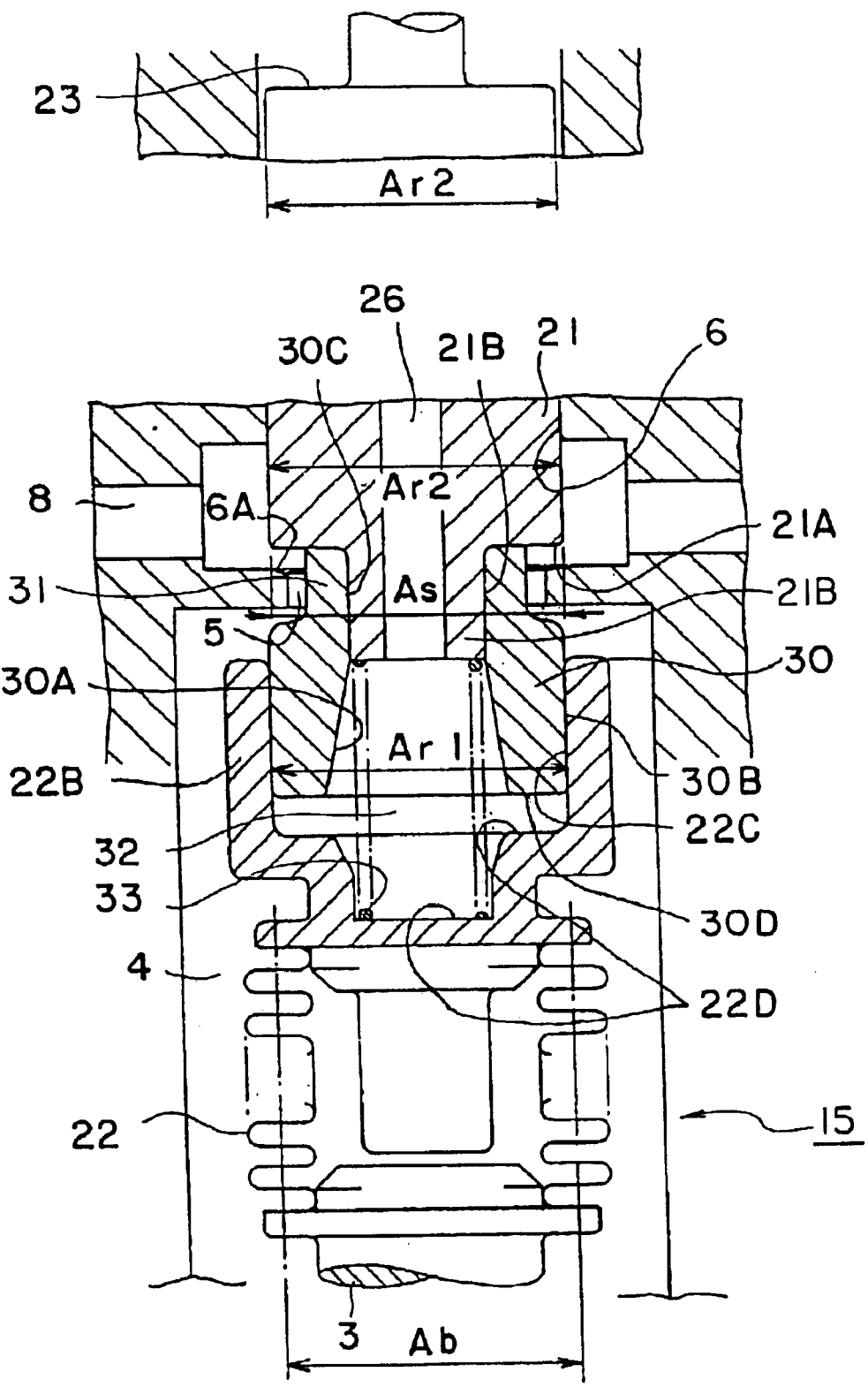
FIG. 2 is an enlarged sectional view of the valve portion shown in FIG. 1.

In FIG. 1 and FIG. 2, 1 signifies a capacity control valve. A valve housing 2 forms an outer shape of the capacity control valve. This valve housing 2 comprises a first valve housing 2A and a second valve housing 2B. The first valve housing 2A has a through hole within which functions are contained. The first valve housing 2A and the second valve housing 2B constitute an integral piece by the second valve housing 2B being fitted over the one end of the first valve housing 2A. The first valve housing 2A is made of metals such as steel, aluminum, stainless or plastic materials. Also the second valve housing 2B is made of magnetic materials such as steel.

In the first valve housing 2A, connected with the one end of the through hole is a separation adjusting portion 3. The second valve housing 2B is disposed separately from the first valve housing 2A due to different functional purposes and materials to be used, that is, the second valve housing 2B needs to be magnetic as well as be connected with the solenoid portion 40. Shapes and forms shown in FIG. 1 may be modified as long as this caution is taken into consideration.

Also the separation adjusting portion 3 sealingly fits the first valve housing 2A so as to block the capacity chamber 4, and tightly fixing by means of screw thread enables it to adjust a spring force in an axial direction of the bellows 22 or a compressive spring, not shown in the figure, disposed in parallel to the bellows 22.

A portion of the through hole axially disposed within the first valve housing 2A constitutes the capacity chamber 4 at one end. In the through hole, the capacity chamber is adjacently and directly connected to a valve hole 5 which is smaller in diameter than that of the capacity chamber. Furthermore, another portion of the through hole constitutes a valve chamber 6 which communicates with the valve hole 5 and is larger in diameter than that of the valve hole 5. Yet another portion of the through hole constitutes an action chamber 7 which communicates with the valve chamber 6. Also at the valve hole 5 of the valve chamber 6 is disposed a valve seat 6A. The profile of the valve seat 6A forms a tapered surface toward the valve hole 5, and when the valve face 21A makes a contact with the tapered surface of the valve seat 6A, a resultant narrow contact width leads to an improved sealing performance.

A first communication passage 8 is disposed in the valve chamber 6 of the valve housing 2. The first communication passage 8 may be directly connected to the process fluid under a control pressure Pd of pneumatic machinery (external) which is not shown in the figure, for example, to the fluid under a discharge pressure (control pressure) Pd of a variable displacement compressor.

In addition, in the action chamber 7 of the valve housing 2 is located a detection communication passage 10 to allow a fluid of external suction pressure Ps. This action chamber 7 is made slightly larger in diameter than the valve chamber 6 so that the suction pressure Ps can act on an action face 23 which is located at the end of the valve body 21 within the large diameter surface. The inner surface of the valve housing 2 located in the side of the valve chamber 6 relative to the large diameter surface constitutes a sliding surface 7A so that the surface is sealingly slidable against the valve body 21.

The sliding surface 7A may simply fit the valve body 21, but a sealing means may be used instead although not shown in the figure. This sealing means is made of a material with a low friction coefficient. For example, this sealing means may be a sealing film wherein a fluoric resin film is coated over the sliding surface 7A, a low friction rubber material, or an O-ring made of fluoric resin. Outer diameter surface of the valve body 21 may be sealingly supported with a fluoric resin O-ring in a slidable manner so as to improve the response of a pressure sensing rod 20 as a whole. The action face 23 is located in the back face of the valve body 21 in the figure, but such an arrangement may be arbitrary. Also it is possible to combine the action chamber 7 with the valve chamber 6 to define an integral valve chamber 6.

In the capacity chamber 4 is disposed a second communication passage 9 to discharge the fluid delivered into the capacity chamber 4 under the control pressure Pd to a control chamber (for example, crank chamber) which does not appear in the figure. The first communication passage 8, the second communication passage 9 and the detection communication passage 10 radially extend to the outer diameter surface of the valve housing 2 in concentrically and two or four equally spaced apart manner.

Contrarily, the fluid under the control pressure Pd can be inducted from the second communication passage 9 to the first communication passage 8 if needed. Reconfiguration of those passages can be made possible by a method wherein the control chamber pressure Pc acting on an effective pressure receiving area Ab of the pressure sensing device 22 and the control pressure Pd acting on the seal pressure receiving area As of the valve body 21 mutually offset with each other because at least two of the three pressure receiving areas are fabricated to approximately an equal amount, namely, the effective pressure receiving area Ab of the pressure sensing device 22, the seal pressure receiving area As of the valve body 21 and the pressure receiving area Ar2 of the action face 23 of the valve body 21.

The above mentioned arrangement change of the respective communication passages does not affect a variety of merits provided by the present invention. Therefore, if there is a problem as to where to install a pneumatic device such as a variable displacement compressor, a design change or reselection of an installation place can be easily done.

Furthermore, the outer diameter surface of the valve housing 2 consists of four step shoulder surfaces. On the outer circumferential surfaces of these four step shoulder surfaces are disposed three annular grooves 46 for disposing O-rings. In each annular groove 46, an O-ring 47 is installed in order to seal between the valve housing 2 and the fitting bore of a casing, not shown in the figure, which fits the valve housing 2.

In the capacity chamber 4 is located a pressure sensing device 22. In the pressure sensing device 22, one end of the metal bellows 22A is sealingly connected with the separation adjuster portion 3 while the other end with the base portion 22P (integral with the engagement portion 22B). The bellows 22A is made of phosphorous bronze or a similar material and its spring coefficient is chosen to have a desired value. A coil spring not shown in the figure may be disposed either inside or outside the bellows 22A so as to act together with the biasing force of the bellows 22A.

The pressure sensing device 22 is designed such that the device expands or contracts according to the relative relationship between the spring force of the pressure sensing device 22 within the capacity chamber 4 and either the control pressure Pd or the control chamber pressure Pc. Internal space of the pressure sensing device 22 is kept vacuum or filled with air, and the pressure sensing device 22 is constructed in such a way that the pressure sensing device 22 contracts when the control pressure Pd or the control chamber pressure Pc acts on the effective pressure receiving area Ab of the bellows 22A.

As shown in FIG. 2, the cylindrical engagement portion 22B is disposed at one end of the pressure sensing device 22. Inside the cylindrical inner surface of the engagement portion 22B is located a guide surface 22C while a seat face 22D is disposed at the end of the cylindrical surface.

The valve body 21 has a valve opening joint portion 30 at one end wherein the valve opening joint portion 30 fits the guide surface 22C in a slidable manner. Outer surface of the valve opening joint portion 30 constitutes a sliding surface 30B. The sliding surface 30B constitutes a pressure receiving area of a cross sectional area Ar1. The sliding surface 30B also forms a sealingly slidable contact with the guide surface 22C. Furthermore, a pressure receiving area 30D is located at the end face of the valve opening joint portion 30. The pressure receiving area 30D forms a joint connection with the seat face 22D.

And the pressure receiving surface 30D is constituted such that the surface 30D disengages from the seat face 22D when the valve body opens quickly. Within the mating surface formed by the sliding surface 30B and the guide surface 22C, an open chamber 30A is located between the valve opening joint portion 30 and the engagement potion 22B.

Inside the valve opening joint portion 30 is located a tapered opening passage 30A, and a second spring biasing means 33 is disposed between the upper potion of the valve opening joint portion 30 as shown in the figure and the concave surface which is a portion of the seat face 22D of the engagement portion 22B so that the spring biasing means 33 gives an urging force in a direction opening the open chamber 32.

Furthermore, in the opposite side to the pressure receiving surface 30D, the valve opening joint portion 30 retains a connecting portion 31 which protrudes into the valve hole 5 and forms a fitting surface 30C in the inner circumferential surface. The fitting surface 30C fits the reduced portion 21B of the valve body 21.

Also in the center of the valve body 21 is located a open passage 26 to communicate from the open chamber 32 via the open passage 30A to the action chamber 7 and the detection communication passage 10. The open passage 26 prevents the open chamber 32 from falling in a negative pressure.

Even when a fluid pressure within the capacity chamber 4 acts on the valve opening joint portion 30, the open passage 26 can introduce a fluid pressure into the open chamber 32 which overcomes the force exerted to the valve opening joint portion 30. Therefore, the valve opening joint portion 30 is forced to instantly disengage from the engagement portion 22B so as to quickly open the valve body 21.

The valve body 21 and the valve opening joint portion 30 are divided so that both can be assembled into the valve hole 5 of the valve housing 2, but the valve body 21 and the valve opening joint portion 30 may be integrated to one piece if necessary.

The outer diameter of the connection portion 31 is made smaller than the diameter of the valve hole 5, and a clearance is formed between the valve hole 5 and the connection portion 31 such that a process fluid can flow through the clearance.

As shown in FIG. 1 or FIG. 2, the valve body 21 connected with the valve opening joint portion 30 is located within the valve chamber 6. The valve body 21 retains a valve face 21A which contacts the valve seat 6A. The area of the circle formed by the valve face 21A being in contact with the valve seat 6A defines a seal pressure receiving area As.

The valve seat 6A and the valve face 21A may be constructed so as to form a planar contact when both contact with each other. However, it is known that having a tapered surface on either the valve seat 6A or the entire surface on the side of the valve seat 6A of the valve chamber 6 is more desirable for a high seal performance and a good contact. The seal pressure receiving area As of the valve face 21A is chosen to be equal or nearly equal to the effective pressure receiving area Ab of the pressure sensing device 22.

Ar2 is defined by the area of the action face 23 of the valve body 21 on which the process fluid acts. The outer diameter of the valve body 21 is nearly equal to the inner diameter of the valve chamber 6, and the valve body 21 fits the valve chamber 6 in a slidable manner.

If the engagement of the valve body 21 with the valve chamber 6 or the sliding surface 7A of the action chamber 7 is secure enough to prevent the fluid under the suction pressure Ps from leaking, other kind of minor leakage may be tolerated. Therefore, a seal such as O-ring is not needed therebetween.

The connecting portion of the valve chamber 6 and the first communication passage 8 is shaped to be an annular groove for an easy inflow of the control pressure (discharge pressure) Pd. And the pressure receiving area Ar2 of the action face 23, the seal pressure receiving area As of the valve face 21A and the effective pressure receiving area Ab are arranged equal or nearly equal to each other. Also in this first embodiment, it is not necessary to keep equal the effective pressure receiving area Ab and the pressure receiving area Ar2 of the action face 23 on which the suction pressure Ps acts.

The action chamber 7 is made slightly larger in diameter than the outer shape of the valve body 21 such that the fluid under the suction pressure Ps from the detection communication passage 10 can smoothly flow into the action chamber 7. The action chamber 7 may be eliminated, by leaving the valve chamber alone and disposing the valve body 21 in the valve chamber 6 as long as the fluid passage is secured. This concludes the description for the constitution of the valve portion 15.

A solenoid rod 25 is disposed on the action face 23 of the valve body 6 in an integral manner, and the foremost valve opening joint portion 30 to the endmost solenoid rod 25 constitute the pressure sensing rod 20. Integral construction of the pressure sensing rod 20 has an advantage of an improved fabrication precision.

Rod end of the solenoid rod 25 is fitted to a mating hole 42A of a plunger 42. Between the action face 23 and the plunger 42 is disposed a fixed iron core 51 which is securely connected to the first valve housing 2A. The solenoid rod 25 is fitted to the inner diameter surface 51A of the fixed iron core 51 in a movable manner.

A spring seating chamber 51C is located in the plunger 42 side of the fixed iron core 51. A spring biasing means 28 (hereafter it may be called an elastically impinging means or a first releasing spring biasing means) is disposed within the spring seating chamber 51C for releasing a closed valve. The spring biasing means 28 elastically urges the plunger 42 away from the fixed iron core 51.

An attractive surface 51B of the fixed iron core 51 and a contact surface 42B of the plunger 42 retain mutually opposing tapered surfaces which can be attached to or detached from each other. Contact or separation of the attractive surface 51B of the fixed iron core 51 and the contact surface 42B of the plunger 42 is controlled by adjusting the intensity of the current given to an solenoid coil 45. A solenoid casing 43 is securely fixed to an end shoulder of the second valve housing 2B, and the solenoid coil 45 disposed in the solenoid portion 40 is controlled by a computer controller which is not shown in the figure.

A plunger casing 44 is securely fitted over the fixed iron core 51 and is retained slidable relative to the plunger 42. One end of the plunger casing 44 is securely fitted into a mating hole 2B1 of the second valve housing 2B, and the other end is securely fixed to a hole at the end portion of the solenoid casing 43. This concludes the description for the constitution of the solenoid portion 40.

In the capacity control valve 1 constructed according to the above descriptions, a relation formula of the individual urging forces generated by the springs disposed and the balancing forces due to the pressures given by the flow-in process fluid, in accordance with the constitution shown in FIG. 1, is given by:

$$Pc(Ab-Ar1)+Pc(Ar1-As)+Pd(As-Ar2)+Ps(Ar2-Ar1)+Ps{\times}Ar1=Fb+S1-Fsol.$$

Rearranging this formula, the next equation is obtained, $$Pc(Ab-As)+Pd(As-Ar2)+Ps{\times}Ar2=Fb+S1-Fsol.$$

Assuming that a relationship between the effective pressure receiving area Ab of the pressure sensing device 22 and the seal pressure receiving area As of the valve face 21A is given by Ab=As, the previous equation becomes:

$$Ps{\times}Ar2+Pd(As-Ar2)=Fb+S1-Fsol.$$

If the effective pressure receiving area Ab of the pressure sensing device 22 and the seal pressure receiving area As of the valve face 21A are arranged equal or nearly equal in the capacity control valve 1, only two kinds of pressures act on the valve body 21, the suction pressure Ps delivered through the detection communication passage 10 and the control pressure Pd coming through the first communication passage 8. Since the suction pressure Ps is able to modulate the control chamber pressure Pc with Ps being complimented by the control pressure Pd, the control precision can be improved as a consequence.

Variables used in the above equations denote as follows.
Ab effective pressure receiving area of the pressure sensing device 22,
As seal pressure receiving area of the valve face 21A,
Ar1 pressure receiving area (cross-sectional area) of the valve opening joint portion 30,
Ar2 pressure receiving area of the action face 23 of the valve body 21,
Fb elastically impinging (spring) force of the pressure sensing device (as a whole)
S1 spring force given by the spring (elastically impinging) means 28 (+releasing spring biasing means 33),
Fsol electromagnetic force by the solenoid coil,
Ps suction pressure,
Pd control pressure (discharge pressure),
Pc control chamber pressure (crank chamber pressure).

Figure 4:
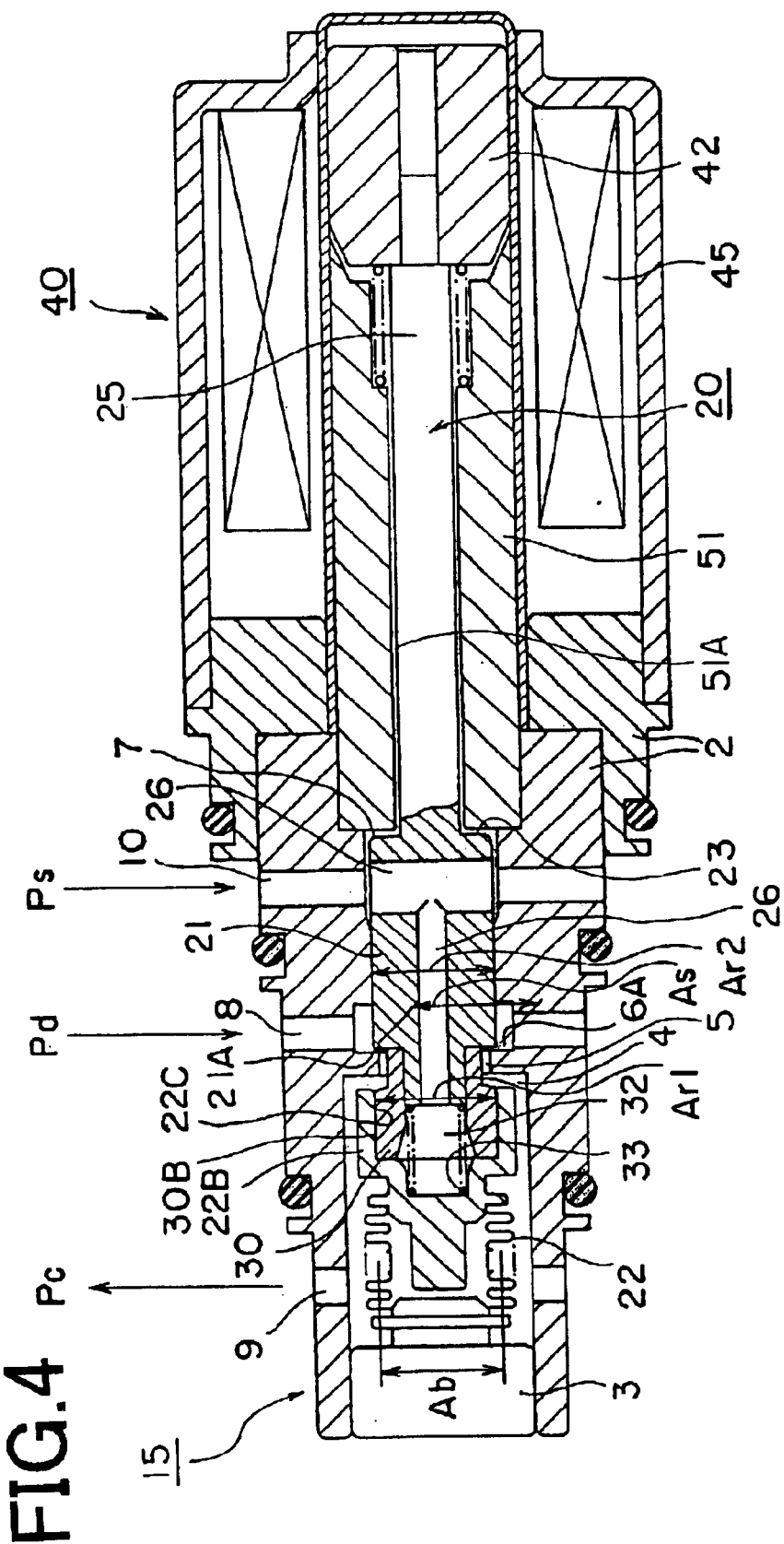
FIG. 4 is a cross sectional view of a capacity control valve as a second preferred embodiment relative to the present invention.

FIG. 4 shows a cross sectional view of a capacity control valve 1 according to a second embodiment of the present invention.

The capacity control valve 1 in FIG. 4 has a very similar constitution to the capacity control valve 1 in FIG. 1. What is different from FIG. 1 is that the effective pressure receiving area Ab of the pressure sensing device 22, the seal pressure receiving area As defined by the contact between the valve face 21A and the valve seat 6A, and the pressure receiving area Ar2 being acted on for the valve body 21 or the action face 23, are all arranged equal or nearly equal to each other.

The state of the valve body 21 in the figure is such that a suction pressure Ps which is larger than a preset value acts on the valve body 21 via the detection communication passage 10, and that a magnetic force is applied to the plunger 42 and the fixed iron core 51 by the solenoid coil 45 to which a more current is supplied than a present value. That is, the valve body 21 is in a half opening position.

Under this circumstance, the control pressure Pd is introduced from the first communication hole 8 via valve hole 5 into the capacity chamber 4, and the control pressure Pd is discharged via the second communication passage 9 to the control chamber (crankcase) which is not shown in the figure, while the effective pressure receiving area Ab of the pressure sensing device 22 is acted on, hence modulating the control chamber pressure (crank chamber pressure) Pc within the control chamber by means of the control pressure Pd.

In the operation of the capacity control valve 1, the force due to the control pressure Pd operated on the effective pressure receiving area Ab of the pressure sensing device 22 and another force due to the control pressure Pd acted on the seal pressure receiving area As of the valve face 21A offset with each other.

And the control pressure Pd delivered through the valve hole 5 can be controlled by the preset suction pressure Ps for the valve body 21 without being disturbed by the forces due to the control pressure Pd and the control chamber pressure Pc.

In this case, an equilibrium equation for the forces acting on the effective pressure receiving area of the pressure sensing device 22 and various pressure receiving areas of the operation mechanism including the valve body 21 and the action face 23, is given by:

$$Pc(Ab-Ar1)+Pc(Ar1-As)+Ps{\times}Ar1+Ps(Ar2-Ar1)+Pd(As-Ar2)=Fb+S1-Fsol.$$

Rearranging the equation becomes $$Pc(Ab-As)+Pd(As-Ar2)+Ps \times Ar2=Fb+S1-Fsol.$$

Arranging equal or nearly equal the effective pressure receiving area Ab of the pressure sensing device 22, the seal pressure receiving area As defined by the contact between the valve face 21A and the valve seat 6A, and the pressure receiving area Ar2 of the action face 23 of the valve body 21 (Ab=As=Ar2), the above equation becomes Ps×Ar2=Fb+ S1−Fsol, and even if the control chamber pressure Pc and the control pressure Pd act on respective pressure receiving areas via the valve hole 5, the forces exerted to the valve body 21 by the control pressure Pd and the control chamber pressure Pc amount to zero because the individual forces offset with each other. Consequentially the valve body 21 can be controlled by the suction pressure Ps and a very accurate capacity modulation can be realized.

Furthermore, when the control chamber pressure Pc exceeds a preset value, e.g., indicating an extreme maximum value, de-energizing the solenoid portion 40 leads to an immediate separation of the valve opening joint portion 30 from the engagement portion 22B due to the spring forces given by respective releasing spring biasing means 28, 33 and the fluid pressure by the process fluid in the open passage 26, the control pressure Pd thus can be altered. During this operation, the valve body 21 is able to retain its open state as the pressure sensing device 22 is compressed by the suction pressure Ps (approximately equal to the control pressure Pd).

For example, when a cooling load becomes great for the variable displacement compressor in an air-conditioning machine, the operation of the variable displacement compressor can be functionally suspended. Therefore, the capacity of the variable displacement compressor can be modulated with no need of clutch.

This capacity control valve 1 is controlled by the suction pressure Ps, and since the forces being acted on the pressure sensing device 22 and the action force 23 offset with each other and the suction pressure Ps urges against the action face 23, the opening area of the valve between the valve body 21 and the valve face 6A can be modulated by the suction pressure Ps.

Figure 5:
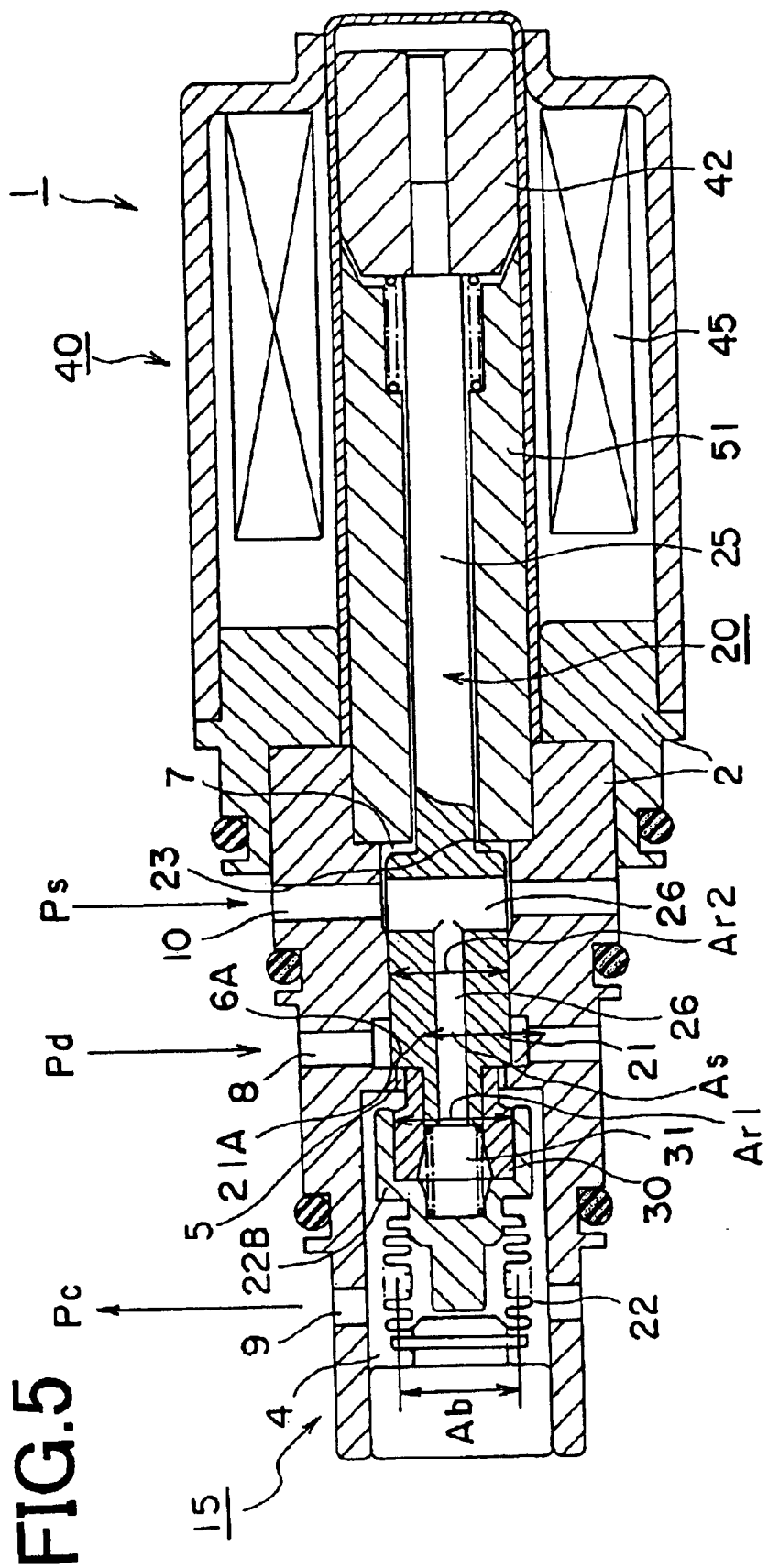
FIG. 5 is a cross sectional view of a capacity control valve as a third preferred embodiment relative to the present invention.

FIG. 5 illustrates a cross sectional view of a capacity control valve 1 according to a third embodiment of the present invention.

What makes FIG. 5 different from FIG. 1 is that the seal pressure receiving area As defined by the contact between the valve face 21A and the valve seat 6A and the pressure receiving area Ar2 being acted on for the valve body 21 or the action face 23 are arranged equal or nearly equal to each other. Other parts are more or less the same as indicated by part numbers.

FIG. 5 indicates a state of the capacity control valve 1 in which either the suction pressure Ps operates on the action face 23 at its maximum strength or the plunger 42 is attracted to the fixed iron core 51 by energizing the solenoid coil 45. This corresponds to the valve body 21 being close to a fully closed position.

Under this situation, as the valve body 21 makes a contact with the valve seat 6A and the fluid under the control pressure Pd acts on the outer diameter surface of the valve body 21, even a high control pressure Pd will not affect the positioning of the valve body 21.

The state of the valve body 21 in the figure is such that the suction pressure Ps higher than a preset value acts on the valve body 21 from the detection communication passage 10, and that a magnetic force is applied to the plunger 42 and the fixed iron core 51 by the solenoid coil 45 to which a more current is supplied than a present value. That is, the valve body 21 is close to being in a closed position.

In this case, a fluid capacity under the control pressure Pd delivered from the first communication passage 8 via valve hole 5 into the capacity chamber 4 decreses.

Under this situation for the capacity control valve 1, the control pressure Pd is canceled according to the relationship between the force acted on the action face 23 of the valve body 21 and the force operated on the seal pressure receiving area As of the valve face 21A. Fluid capacity under the control pressure Pd which flows through the valve hole 5 is complimented by the control chamber pressure Pc and can be controlled by the preset suction pressure Ps in the action chamber 7 without being affected by the control pressure Pd. Therefore, a capacity modulation of the valve body 21 in the capacity control valve 1 will be enhanced.

In this case, an equilibrium equation for the forces acting on various pressure receiving areas of the operation mechanism including the pressure sensing device 22, the valve face 21A of the valve body 21 and the action face 23, is given by:

$$Pc(Ab-Ar1)+Ps \times Ar1+Pc(Ar1-As)+Ps(Ar2-Ar1)+Pd(As-Ar2)=Fb+S1-Fsol.$$

Rearranging the equation becomes $$Pc(Ab-As)+Pd(As-Ar2)+Ps \times Ar2=Fb+S1-Fsol.$$

Letting equal or nearly equal the seal pressure receiving area As defined by the contact between the valve face 21A and the valve seat 6A, and the pressure receiving area Ar2 of the action face 23 of the valve body 21 (As=Ar2), the above equation becomes $$Pc(Ab-As)+Pd(As-Ar2)+Ps \times Ar2=Fb+S1-Fsol,$$

and
even when the control pressure Pd acts on the pressure receiving area via the valve hole 5, a net force exerted to the valve body 21 by the control pressure Pd becomes zero because the individual forces offset with each other.

Furthermore, when the control chamber pressure Pc exceeds a preset value, e.g., indicating an extreme maximum, de-energizing the solenoid portion 40 leads to an immediate opening of the valve body 21 due to the spring forces given by respective releasing spring biasing means 28, 33 and the fluid pressure by the process fluid in the open passage 26, hence switching of the control pressure is realized. During this operation, the valve body 21 is able to retain its open position as the pressure sensing device 22 is compressed by the suction pressure Ps (approximately equal to the control pressure Pd).

For example, when a cooling load becomes great for the variable displacement compressor in an air-conditioning machine, the operation of the variable displacement compressor can be functionally suspended. Therefore, the function is effectively materialized without use of clutch.

Figure 7:
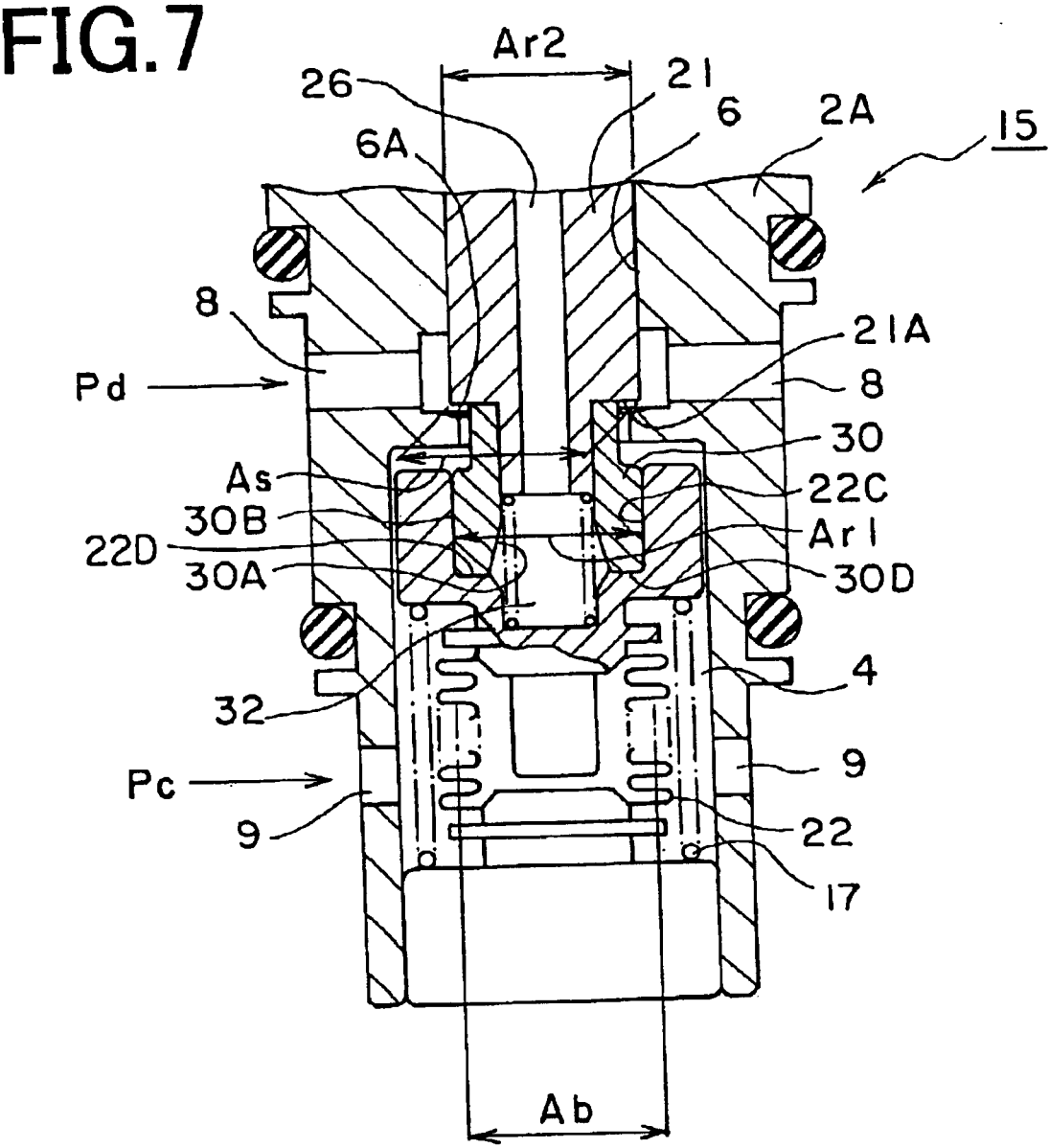
FIG. 7 is a cross sectional view of the valve portion of a capacity control valve as a fourth preferred embodiment relative to the present invention.

FIG. 7 shows a cross sectional view of a portion of a capacity control valve 1 according to a fourth embodiment of the present invention.

The capacity control valve 1 in FIG. 7 has a very similar constitution to the capacity control valve 1 in FIG. 1. A difference resides in that a coil spring (elastically impinging means) 17 is located in the pressure sensing device 22 so as to give a spring force in a direction opening the valve body 21. Although the coil spring 17 may be disposed inside the bellows 22A, here the coil diameter is made larger so that the engagement portion 22B is resiliently supported in a more stable manner.

The elastically impinging means 17 such as a coil spring may be disposed outside the pressure sensing device 22 instead of inside the pressure sensing device 22 as seen in FIG. 1. Where this coil spring 17 should be disposed depends on a design problem relating to the valve housing 2 and the pressure sensing rod 20, but disposing in one place as an intrinsic spring feature of the pressure sensing device 22 will be effective. Total design including the coil spring 17 constitutes the pressure sensing device 22.

Figure 8:
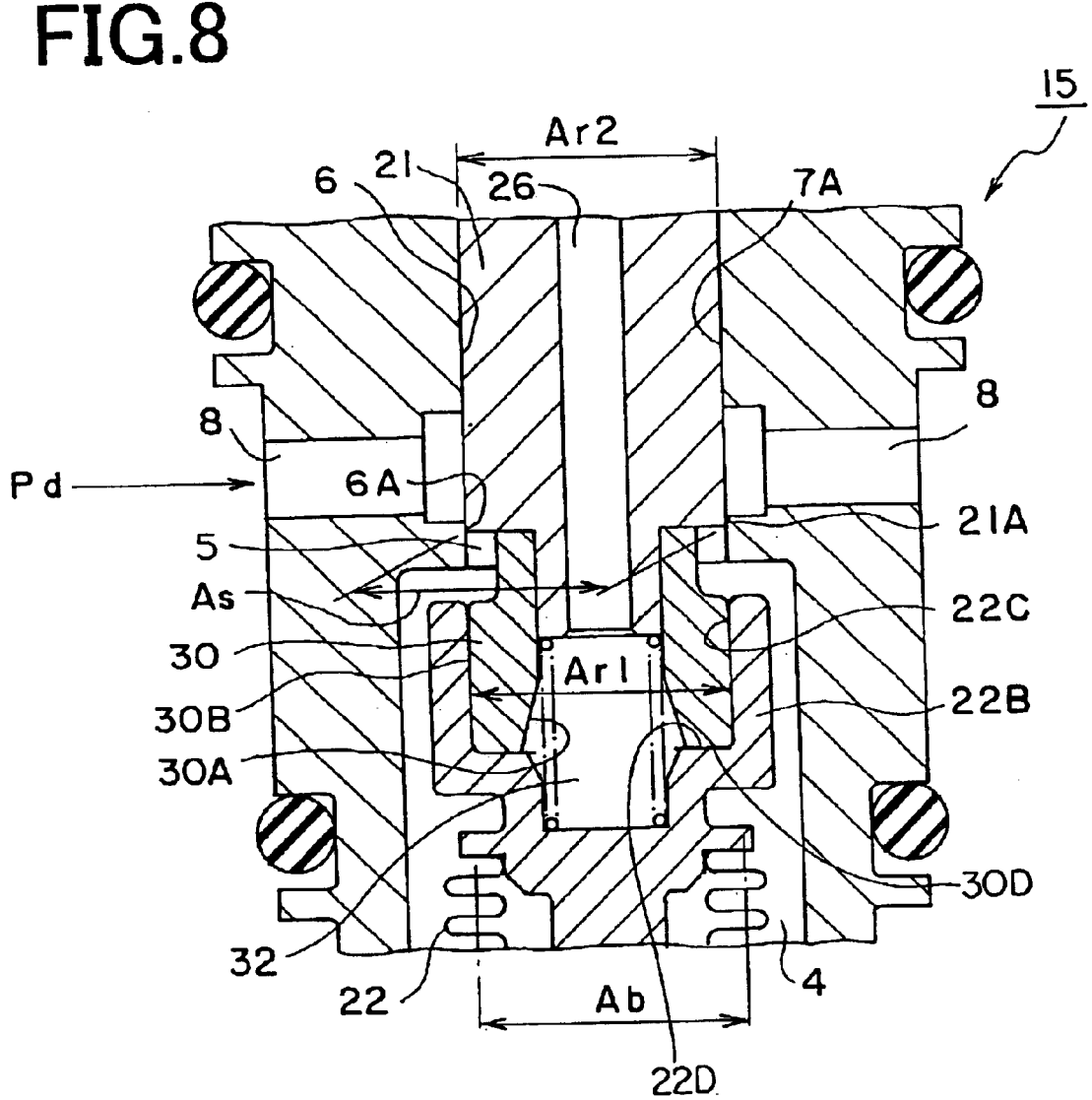
FIG. 8 is a cross sectional view of the valve portion of a capacity control valve as a fifth preferred embodiment relative to the present invention.

FIG. 8 shows a cross sectional view of a portion of a capacity control valve 1 according to a fifth embodiment of the present invention.

The capacity control valve 1 in FIG. 8 has a very similar constitution to the capacity control valve 1 in FIG. 1. A difference resides in that the valve seat 6A is disposed on the inner diameter surface in the valve hole 5 side of the valve chamber 6. Also the outer diameter surface of the valve body 21 constitutes the valve face 21A.

The valve is closed by the valve face 21A being sealingly fitted to the valve seat 6A in a slidable manner. In this construction, the pressure receiving areas of the pressure receiving surface 30D and the action face 23 are made equal or nearly equal to each other, and an advantage is even greater if the pressure receiving area of the pressure receiving surface 30D is set equal or nearly equal to the effective pressure receiving area of the bellows 22A.

In FIG. 8, as an example, the valve opening joint portion 30 has the same shape as the engagement portion 22B does, and retains a sliding surface 30B on the inner diameter surface. The engagement portion 22B also retains a cylindrical form, similarly to the valve opening joint portion 30, as well as a guide surface 22C on its outer diameter surface. The sliding surface 30B of the valve opening joint portion 30 and the guide surface 22C of the engagement portion 22B mate with each other in a slidable manner, and an open chamber 32 is located between the two axially opposing faces of these two portions inside the mating surface. This open chamber 32 communicates with the open passage 26 which is disposed in the center of the valve body 21. The open passage 26 then communicates with the action chamber 7.

Figure 9:
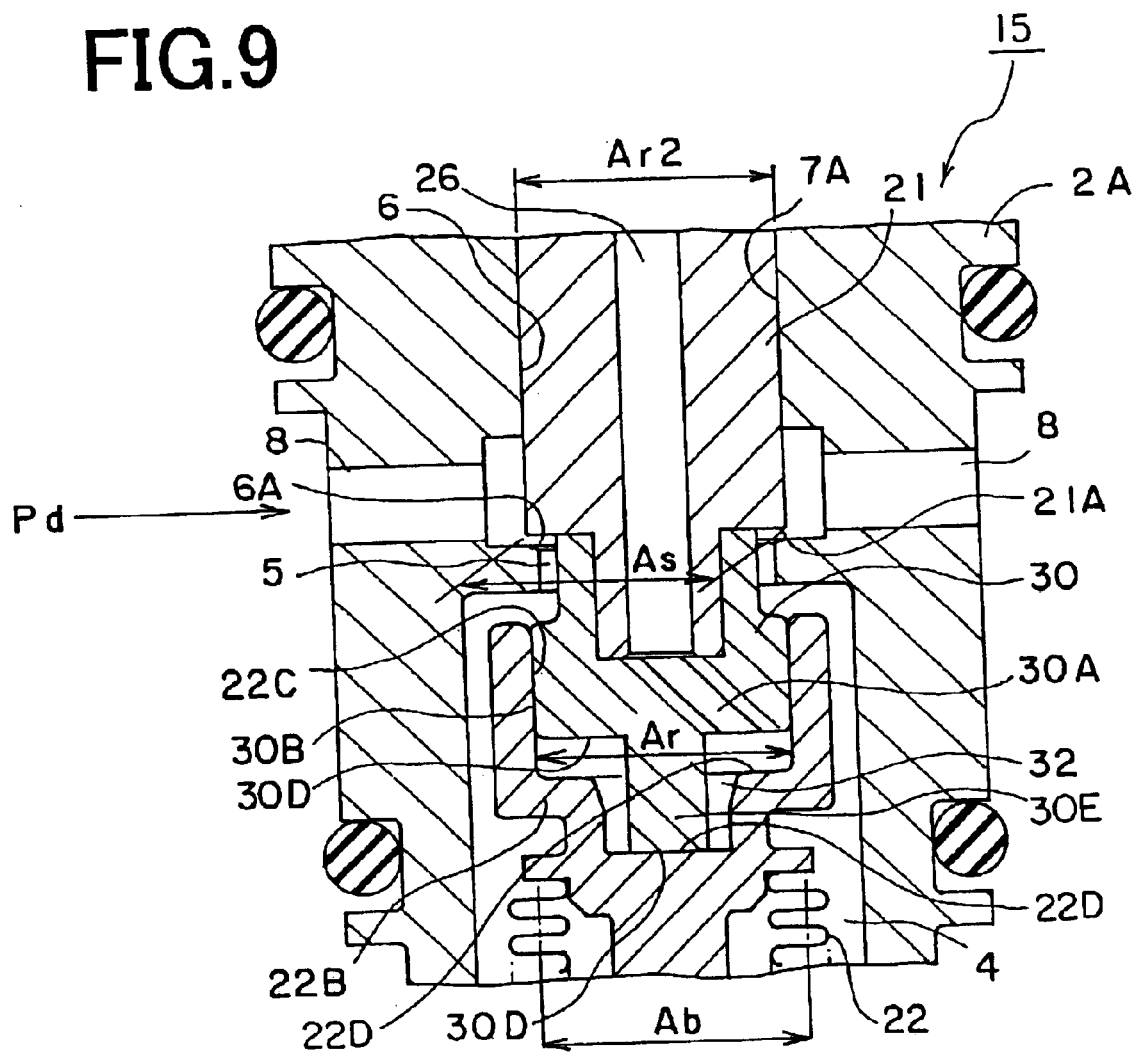
FIG. 9 is a cross sectional view of the valve portion of a capacity control valve as a sixth preferred embodiment relative to the present invention.

FIG. 9 shows a cross sectional view of a portion of a capacity control valve 1 according to a sixth embodiment of the present invention.

The capacity control valve 1 in FIG. 9 has a very similar constitution to the capacity control valve 1 in FIG. 1. A difference resides in that the pressure receiving area 30 of the valve opening joint portion 30 retains a protruded portion 30E and that the tapered widening open passage 30A is replaced by a plurality of tilted open passages 30A1 communicating with the open chamber 32. In the valve opening joint portion 30 with the protruded portion 30E, the open chamber 32 can be easily formed between the valve opening joint portion 30 and the engagement portion 22B. As the suction pressure Ps always acts on the pressure receiving surface 30D via the open passage 26, the force exerted on the pressure receiving surface 30D and the force operated on the action face 23 cancel each other because of force equilibrium.

Figure 3:
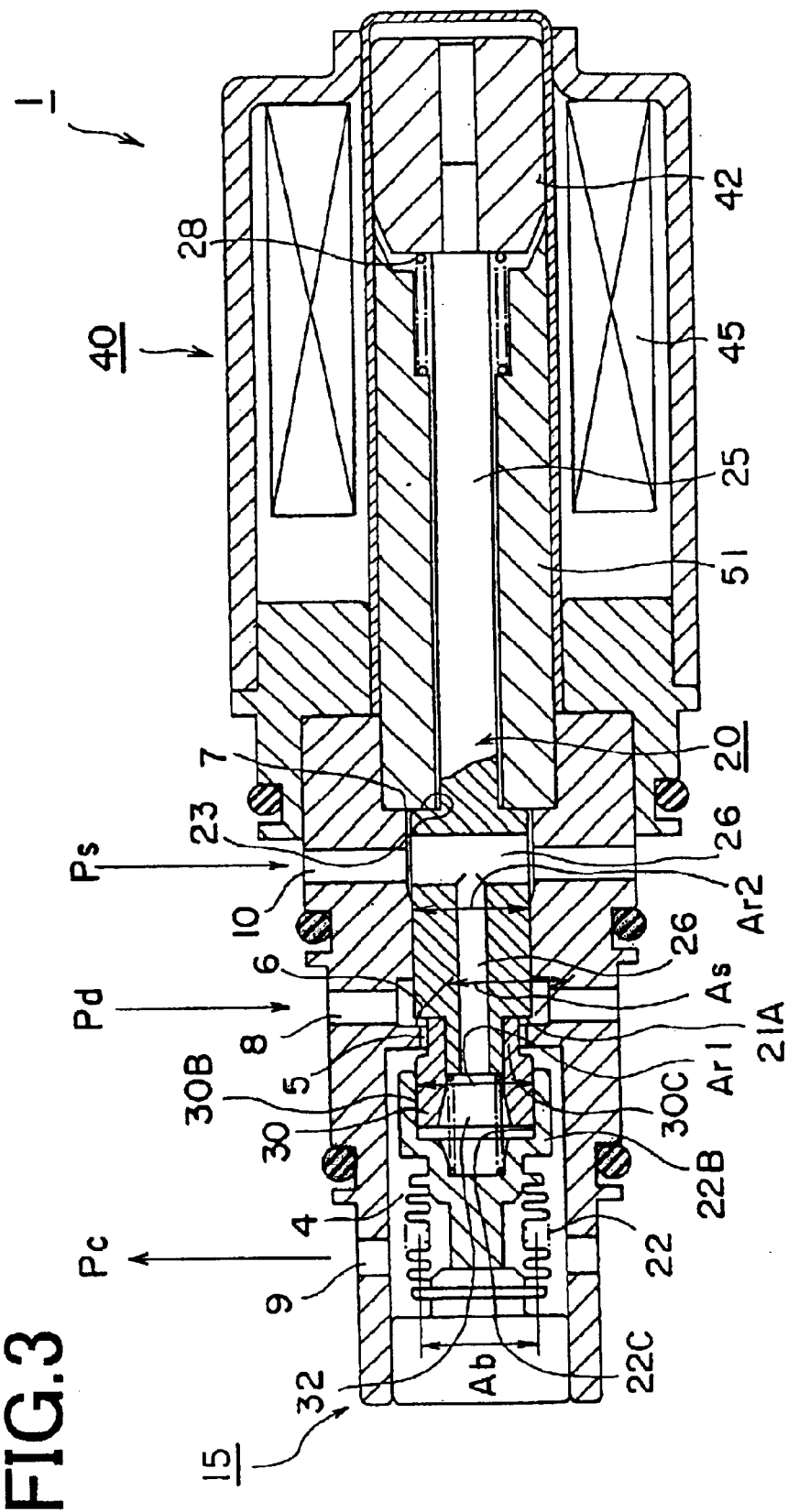
FIG. 3 is a cross sectional view of the capacity control valve in its open position shown in FIG. 1, FIG. 4 and FIG. 5.

FIG. 2 and FIG. 3 illustrate the valve body 21 in its open position for the capacity control valve 1 shown in FIG. 1, FIG. 4 and FIG. 5.

In the capacity control valve 1 of FIG. 1, FIG. 4 and FIG. 5, as previously mentioned, pressures other than the offsetting process fluid pressures act on the valve body 21 so as to compensate for the suction pressure Ps. On the other hand, energizing the solenoid portion 40 leads to the operation of the plunger 42 according to the level of the supplied current and urges the valve body 21 to move against respective spring biasing means 28, 33 in a direction closing the valve. The suction pressure Ps simultaneously acts on the action face 23 of the valve body 21 so as to move the valve body 21 in a direction closing the valve.

When the control chamber pressure Pc exceeds a preset operational range during the operation, de-energizing the solenoid coil 45 by a computer controller which is not shown in the figure, the plunger 42 is urged by the spring biasing means 28, 33 in a direction opening the valve, and the valve opening joint portion 30 immediately moves from the engagement portion 22B to a direction opening the valve body 21. Under the open position of the valve body 21, the amount of the fluid under the control pressure Pd leaking from between the sliding surface 30B of the valve opening joint portion 30 and the guide surface 22C of the engagement portion 22B will be negligible, because the sliding surface 30B and the guide surface 22C form a fit engagement. Especially the suction pressure Ps acting via the open passage 26 in the open chamber 32 effectively prevents the control pressure Pd from flowing in through a fit clearance between the sliding surface 30B and the guide surface 22C.

As the pressure sensing device 22 is urged in a contracting direction by the increased suction pressure Ps within the open chamber 32, the valve body 21 maintains its open position and this serves the same effect as a clutch for a variable displacement compressor. That is, the valve can be utilized as a capacity control valve 1 for a variable displacement compressor.

The pressure sensing device 20 located in the variable displacement compressor shown in FIG. 1, FIG. 4, and FIG. 5 constitutes an integral piece including the valve body 21 and the solenoid rod 25. This makes the centering process in machining easier and improves the precision of the fit surfaces of the pressure sensing rod 20 and the valve body 21 in particular. Furthermore, a sliding friction for the pressure sensing rod 20 is reduced and the operational response is substantially improved. Also as mentioned before, all the functional surfaces located in the through hole of the valve housing 2 can be fabricated simultaneously and the machining precision will be enhanced. This leads to a decrease in the sliding friction with respect to the pressure sensing rod 20.

Figure 10:
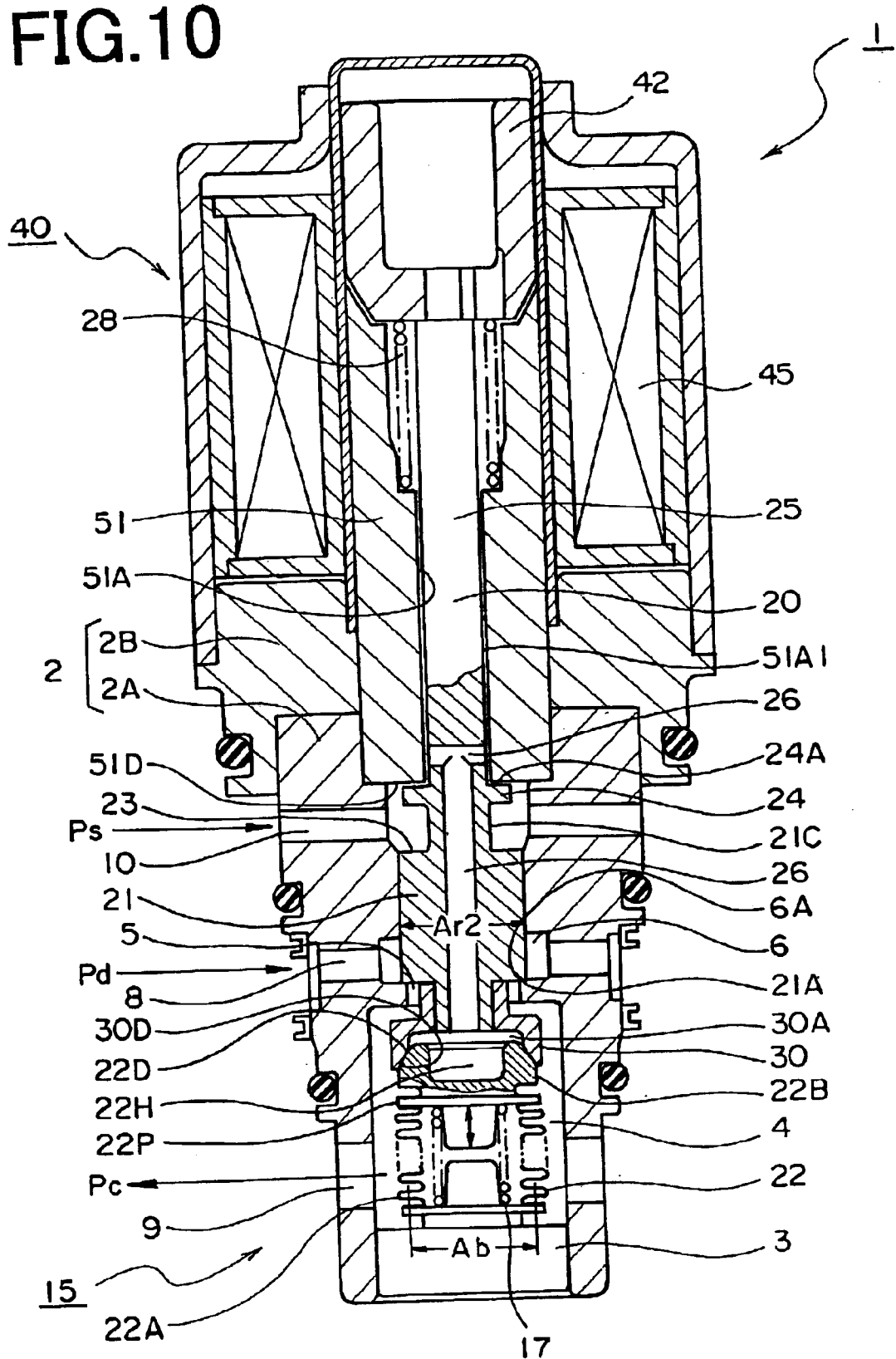
FIG. 10 is a cross sectional view of a capacity control valve as a seventh preferred embodiment relative to the present invention.
Figure 11:
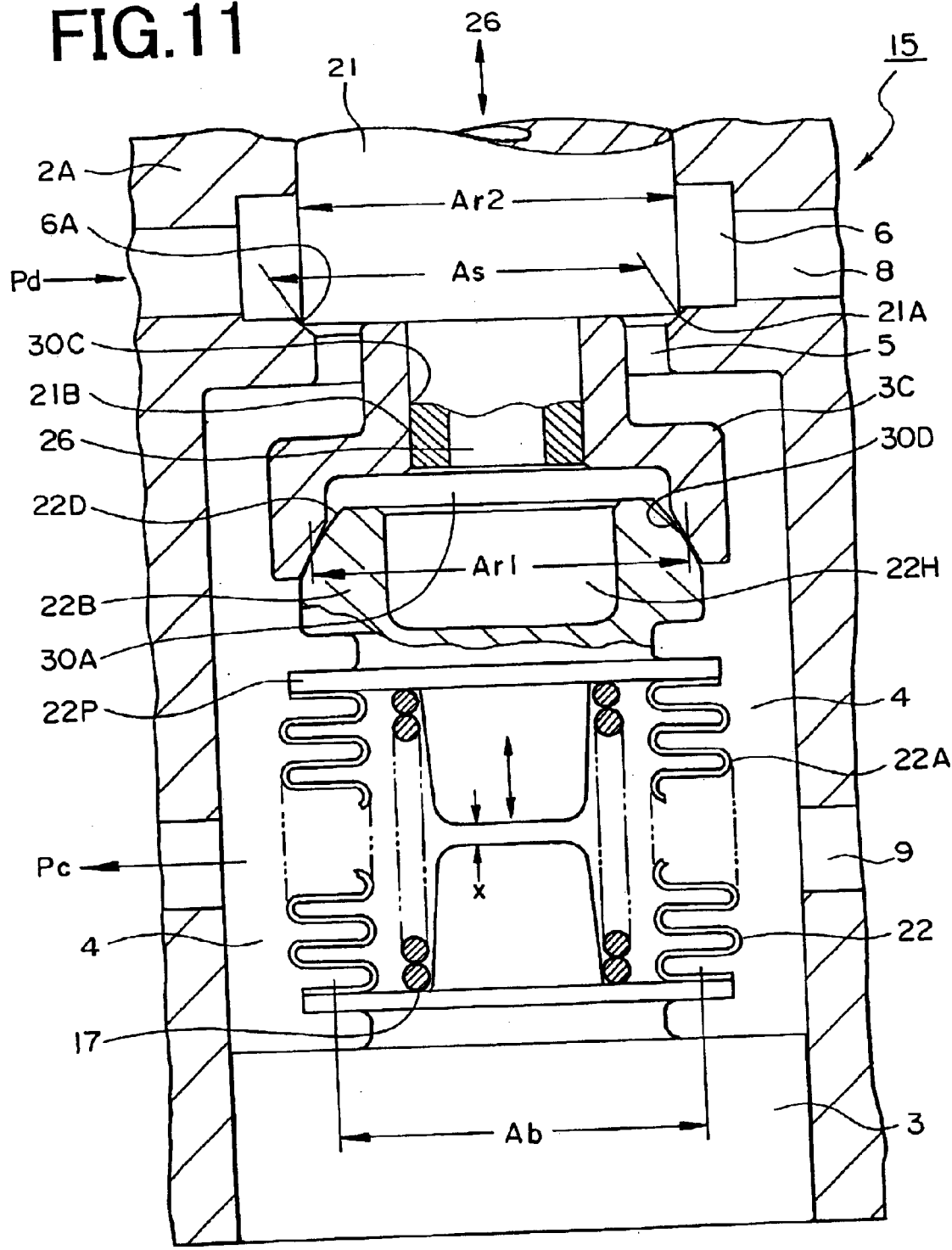
FIG. 11 is an enlarged sectional view of the valve portion of the capacity control valve shown in FIG. 10.

FIG. 10 shows a cross sectional view of a capacity control valve 1 according to a seventh embodiment of the present invention. FIG. 11 is an enlarged cross sectional view of a valve portion 15 of the capacity control valve 1 in FIG. 10.

The capacity control valve 1 in FIG. 10 and FIG. 11 has a very similar constitution except the first key portion to the capacity control valve 1 in FIG. 1. The first key portion in FIG. 10 and FIG. 11 is that the seat face 22D at the tip of the engagement portion 22B has a top-flat spherical shape. The seat face 22D which has a spherical shape may be altered to a tapered shape.

The pressure receiving surface 30D of the valve opening joint portion 30 making a contact with the seat face 22D has a tapered shape, but may have a spherical shape, too. The seat face 22D and the pressure receiving surface 30D are to form nearly a line contact or narrow width planar contact between the spherical surface and the tapered surface which face in opposite direction. This narrow width contact tolerates a tilting contact.

The seat face 22D and the pressure receiving surface 30D may also form a contact by two convex spherical surfaces or a combination of a concave spherical surface and a convex spherical surface where the convex spherical surface has a different diameter from the concave surface. The spherical contact formed by the concave surface and the convex surface needs to possess a small contact width. Keeping the contact width small leads to a low contact friction, and the contact surface of the seat face 22D and the pressure receiving surface 30D constituting a valve mechanism realizes a sliding contact. This prevents the pressure sensing rod 20 from becoming eccentric even when the engagement portion 22B supported by the pressure sensing device 22 is tilted.

Furthermore, in the capacity control valve 1 in FIG. 10 as another embodiment of the present invention, an open passage 26 is not disposed in the valve body 21. This kind of capacity control valve can be realized by making the width of the contact surface of the seat face 22D and the pressure receiving surface 30D small as shown in FIG. 10 through FIG. 14. If the contact width is kept small, then the contact of the seat face 22D and the pressure receiving surface 30D can be easily disengaged.

The open passage 30A shown in FIG. 10 and FIG. 11 is set larger in diameter than the open passage 30A in FIG. 1 in accordance with the above mentioned constitution, and the diameter of the pressure receiving area Ar1 of the valve opening joint portion 30 defined by a narrow width contact between the seat face 22D and the pressure receiving surface 30D should be chosen approximately equal to the effective pressure receiving area Ab of the pressure sensing device 22 and the seal pressure receiving area As of the valve face 21A.

A cavity 22H is disposed inside the top-flat spherical surface of the engagement portion 22B, and the cavity 22H communicates with the open passage 26. The engagement portion 22B is integrally connected via a base portion 22P with the bellows 22A of the pressure sensing device 22.

Under the above mentioned contact state between the engagement portion 22B and the valve opening joint portion 30, the engagement portion 22B is supported by the flexible bellows 22A which is deformable in a tilting direction as well as in a radial direction. Therefore, the seat face 22D of the engagement portion 22B is able to maintain a contact with the pressure receiving surface 30D of the valve opening joint portion 30 while being tilted during the operation.

Spherical shape of either the seat face 22D or the pressure receiving surface 30D realizes a narrow width contact, and even if the engagement portion 22B forms a contact on the tilt with the valve opening joint portion 30D, no excessive force to cause an eccentricity is induced for the axial movement of the valve body 21.

Therefore, while the pressure sensing rod 20 operates in an axial direction, the sliding surface between the valve body 21 and the first valve housing 2A or between the pressure sensing rod 20 and the first valve housing 2A can operate without wear due to an exceeding contact force. As the result, the response of the pressure sensing rod 20 is enhanced.

A coil spring 17 is disposed within the bellows 22A. This coil spring 17 tends to act so as to urge the engagement portion 22B to make a precise, axial movement with no tilt. The engagement portion 22B can operate in an axial direction without tilting, accordingly. And the pressure sensing rod 20 shows a good response due to a reduced sliding friction. A distance X between the upper and lower stoppers located within the bellows 22A is chosen between 0.5 mm and 0.8 mm as an embodiment example.

A second key portion which represents another difference from the capacity control valve 1 in FIG. 1 is that the open passage 26 located at the center of the pressure sensing rod 20 communicates with a passage 51A1 within the fixed iron core 51.

In addition, a second valve portion 24 which opens or closes relative to a second valve seat 51D located in the end of the fixed iron core 51 forms a flange in the valve body 21. A second valve face 24A of the second valve portion 24 operates with the second valve seat 51D of the fixed iron core 51. This represents a second valve 24A, 51D which opens or closes between the detection communication passage 10 and the open passage 26.

Closing a valve by the second valve face 24A of the second valve portion 24 contacting the second valve seat 51D shuts off the flow to the detection communication passage 10 even when a fluid under the control chamber pressure Pc is allowed to be delivered to the open passage 26. That is, the second valve face 24A and the second valve seat 51D closes the communication between the second communication passage 9 and the detection communication passage 10 when the pressure sensing rod 20 is in action.

Travel distance of the second valve face 24A is, for instance, in the range of 0.2 mm to 0.5 mm. The diameter of the second valve face 24A should be large enough to be able to close the valve with the second valve seat 51D.

The constitution of the second valve 24A, 51D may take many different forms. In FIG. 10, for example, an O-ring disposed in the groove of the pressure sensing rod 20 can be used in place of the second valve 24 so that the O-ring sealingly fits the inner diameter surface 51A of the fixed iron core 51 when the valve body 21 opens. A fit clearance between the pressure sensing rod 20 and the inner diameter surface should be small enough to achieve a good seal performance. This is because a fluid leakage from the fit clearance between the pressure sensing rod 20 and the inner diameter surface can be kept negligibly small. The second valve portion 24 disposed either in the valve body 21 or in the pressure sensing rod 20 serves one mating part of the valve which acts to open or close the open passage 26.

A small diameter portion 21C is located within the action chamber 7 between the second valve portion 24 and the valve body 21, and the small diameter portion 21C retains an action face 23 on the back face of the valve body 21. The small diameter portion 21C also enhances the fluid flow between the detection communication chamber 10 and the open passage 26.

Other parts of the capacity control valve 1 in FIG. 10 are more or less the same as the capacity control valve 1 in FIG. 1 as signified by the same numbers.

In the capacity control valve 1 constructed according to the above descriptions, a relation formula of the individual urging forces generated by the springs disposed and the balancing forces due to the pressures exerted by the process fluid, in accordance with the constitution shown in FIG. 10, is given by:

$$Pc(Ab-Ar1)+Pc(Ar1-As)+Pd(As-Ar2)+Ps(Ar2-Ar1)+Ps=Ar1=Fb+S1-Fsol.$$

Rearranging this formula, the next equation is resulted, $$Pc(Ab-As)+Pd(As-Ar2)+Ps \times Ar2=Fb+S1-Fsol.$$

Assuming that a relationship between the effective pressure receiving area Ab of the pressure sensing device 22 and the seal pressure receiving area As of the valve face 21A is represented by Ab=As, the previous equation becomes:

$$Ps \times Ar2+Pd(As-Ar2)=Fb+S1-Fsol.$$

If the effective pressure receiving area Ab of the pressure sensing device 22 and the seal pressure receiving area As of the valve face 21A are arranged equal or nearly equal, in the capacity control valve 1, only two kinds of pressures act on the valve body 21, the suction pressure Ps delivered through the detection communication passage 10 and the control pressure Pd coming through the first communication passage 8. As the suction pressure Ps can modulate the control chamber pressure Pc with Ps being complimented by the control pressure Pd, the control precision will be improved as a consequence.

Figure 12:
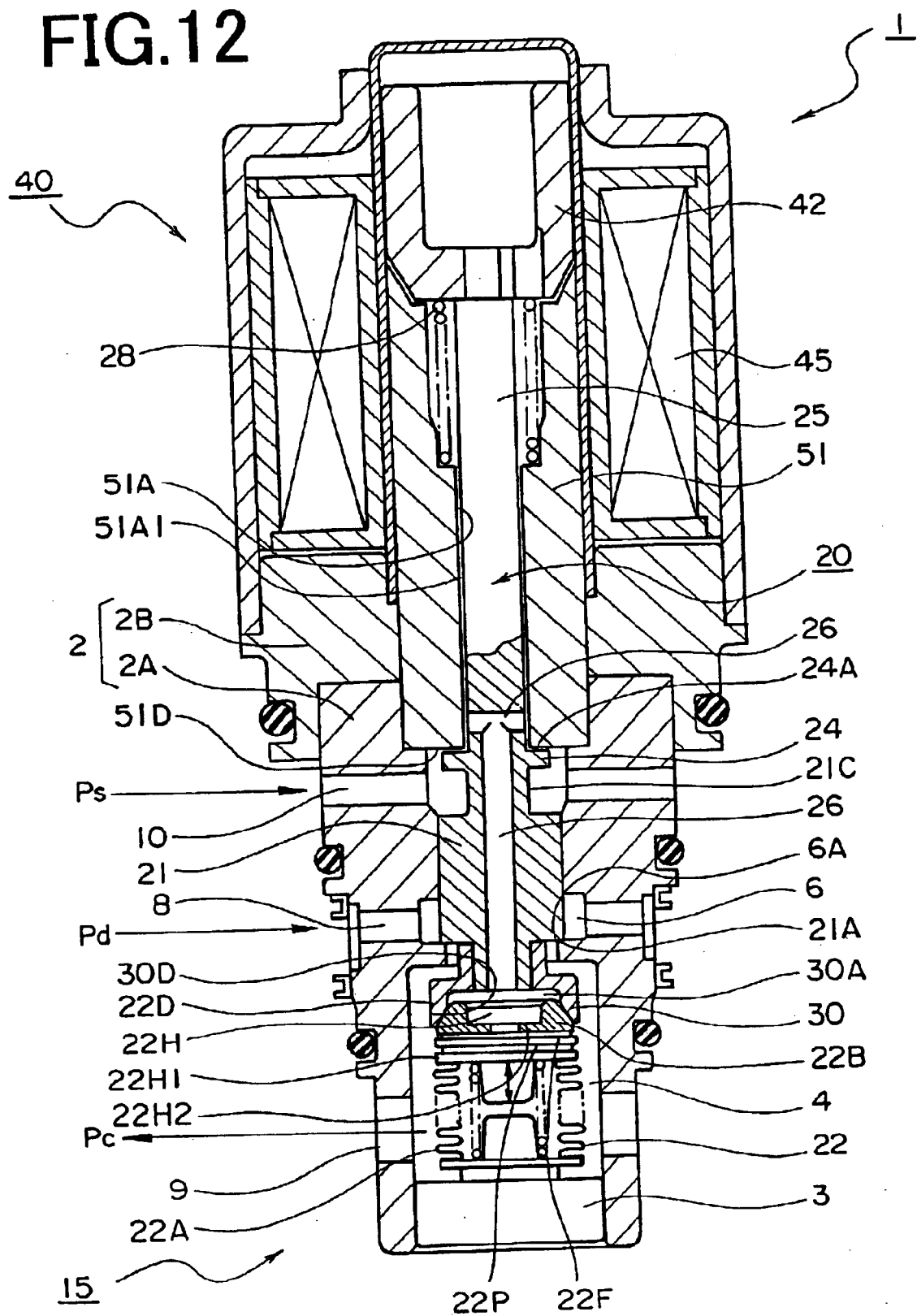
FIG. 12 is a cross sectional view of a capacity control valve as an eighth preferred embodiment relative to the present invention.
Figure 13:
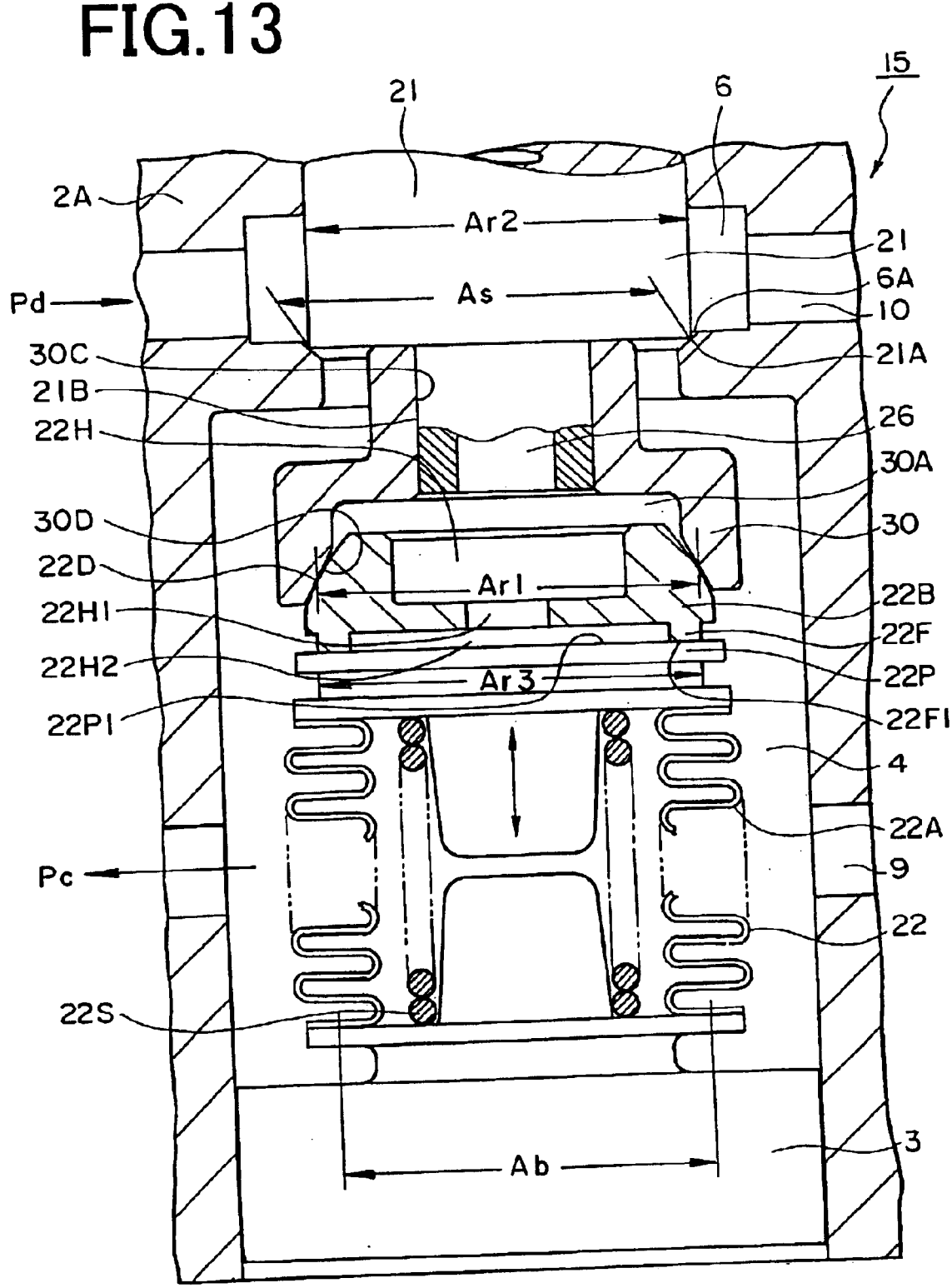
FIG. 13 is an enlarged sectional view of the valve portion of the capacity control valve shown in FIG. 12.

FIG. 12 and FIG. 13 shows a cross sectional view of a capacity control valve 1 according to an eighth embodiment of the present invention.

What makes FIG. 12 and FIG. 13 different from FIG. 10 is that the engagement portion 22B and the base portion 22P are divided.

The engagement portion 22B retains a division portion 22F on which a sealing contact surface is located to form a contact with the base portion 22P. The division portion 22F retains an annular protrusion toward the base portion 22P in an integral manner, and a third open passage 22H2 is a cylindrical chamber which is located inside the inner diameter surface of the division portion 22F.

The third open passage 22H2 communicates via a second open passage 22H1 with a cavity portion 22H. The cavity portion 22H then communicates via the open passage 26 with the tapered widening open passage 30A.

Spherical seat face 22D of the engagement portion 22B makes a sliding contact with the pressure receiving surface 30D of the valve opening joint portion 30, and a division surface 22F1 sealingly contacts a planar division surface of the base portion 22P in a slidable manner along the surface. The pressure sensing rod 20 thus can steadily move in an axial direction even when the base portion 22P of the bellows 22 is tilted during the operation. This helps the pressure sensing rod 20 perform a good response without increasing a friction force. Furthermore, as the engagement portion 22B is decoupled from the pressure sensing device 22 and the valve opening joint portion 30, assembly of the pressure sensing device 22 and the pressure sensing rod 20 to the valve housing 2 is simplified.

When the base portion 22P and the engagement portion 22B form a sealing contact by their respective division surfaces 22P1, 22F1, a fluid pressure acts on between the planar division surface 22P1 of the base portion 22P and the division surface 22F1 of the engagement portion 22B due to a through communication of the third open passage 22H2 and the open passage 26, and this prevents both division surfaces 22P1, 22F1 from sliding against each other and avoids a possible failure of the pressure sensing rod 20.

Other parts of the capacity control valve 1 in FIG. 13 are more or less the same as the capacity control valve 1 in FIG. 10 as indicated by the same numbers.

In the capacity control valve 1 constructed according to the above descriptions, assuming that Ab=As holds with respect to the effective pressure receiving area Ab of the pressure sensing device 22 and the seal pressure receiving area As of the valve face 21A, a relation formula of the individual urging forces generated by the springs disposed and the balancing forces due to the pressures exerted by the process fluid is given by:

$$Ps \times Ar2 + Pd(As - Ar2) = Fb + S1 - Fsol.$$

If the effective pressure receiving area Ab of the pressure sensing device 22 and the seal pressure receiving area As of the valve face 21A are arranged equal or nearly equal, only two kinds of pressures act on the valve body 21 in the capacity control valve 1, the suction pressure Ps delivered through the detection communication passage 10 and the control pressure Pd coming through the first communication passage 8. As the suction pressure Ps can modulate the control chamber pressure Pc with Ps being complimented by the control pressure Pd, the control precision will be improved as a consequence.

Figure 14:
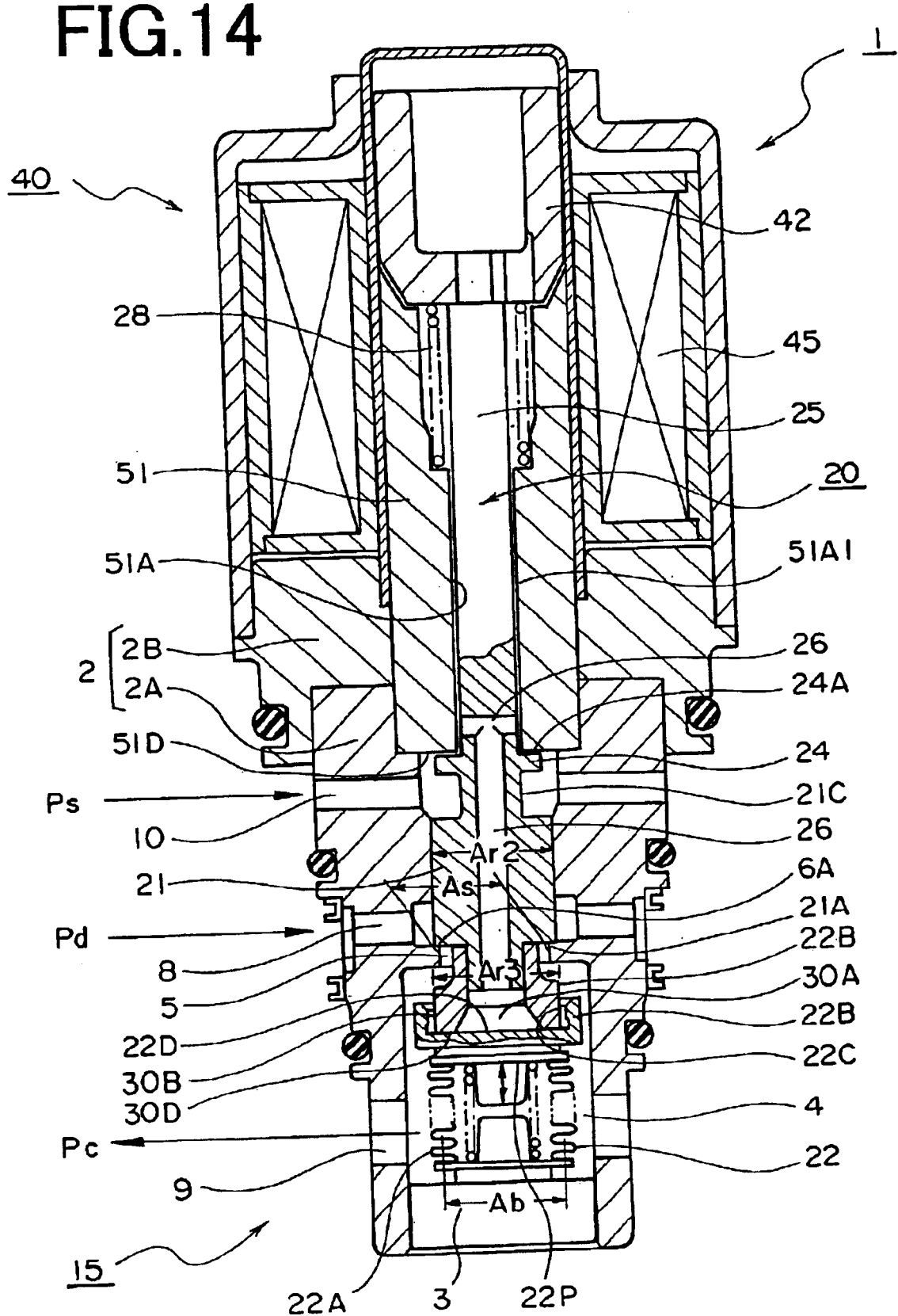
FIG. 14 is a cross sectional view of a capacity control valve as an ninth preferred embodiment relative to the present invention.
Figure 15:
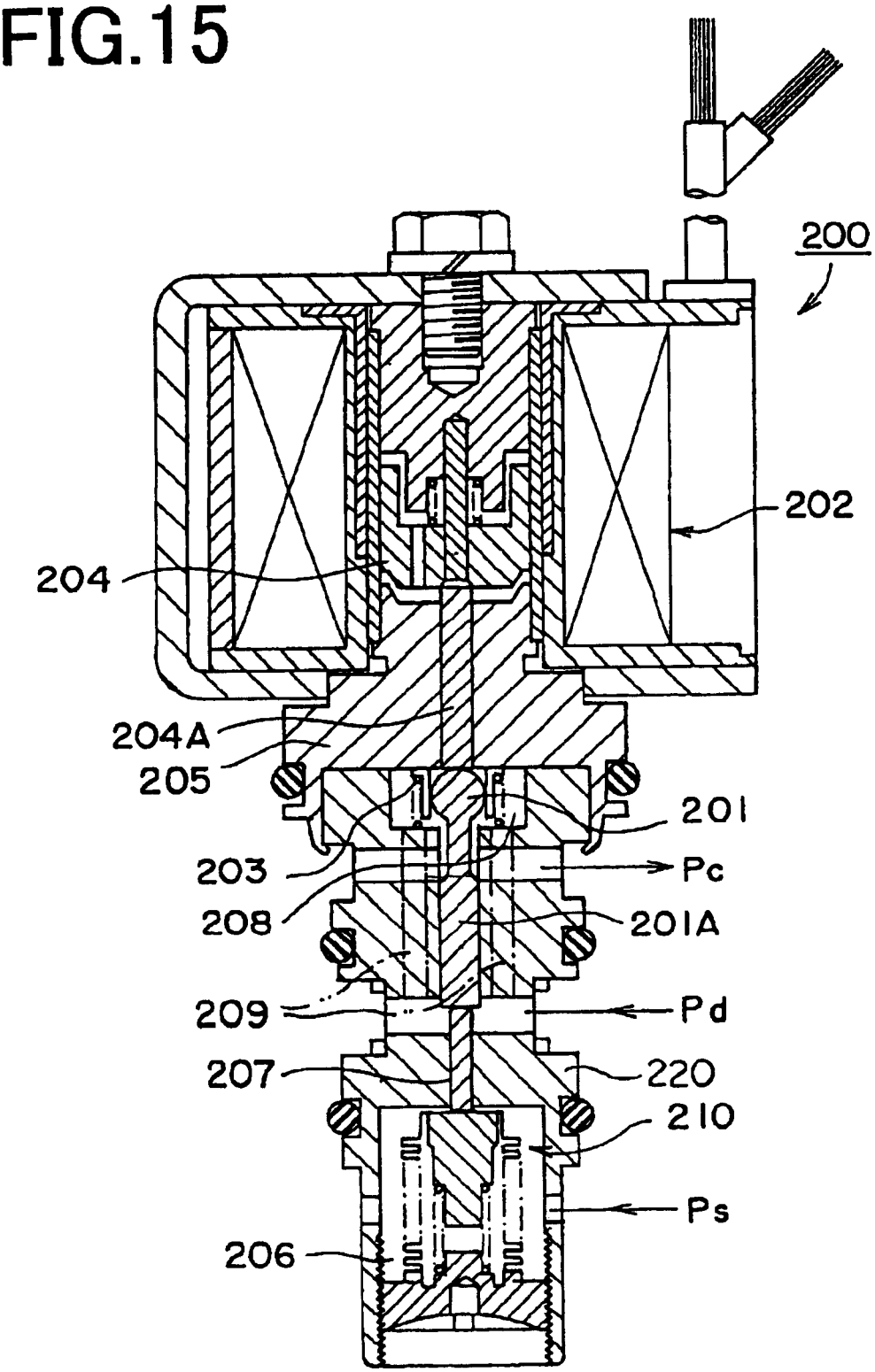
FIG. 15 is a cross sectional view of the capacity control valve for a variable displacement compressor relative to the present invention.

FIG. 14 shows a cross sectional view of a capacity control valve 1 according to a ninth embodiment of the present invention.

What makes FIG. 14 different from FIG. 10 is that the engagement portion 22B forms a bottomed cylindrical tube and this bottom serves as a seat face 22D. The inner diameter surface of the cylinder serves a guide surface 22C, and the guide surface 22C forms a tapered opening in the upper portion of the figure. A purpose of the cylindrical portion is merely to guide a sliding surface 30B, and a flanged flat plate may be used instead.

The sliding surface 30B of the valve opening joint portion 30 inserted to the guide surface 22C has a diameter surface. Clearance between the guide surface 22C of the engagement portion 22B and the sliding surface 30B of the valve opening joint portion 30 is provided such that the valve opening joint portion 30 and the engagement portion 22B are not constrained in terms of their radial movement, and the seat face 22D of the engagement portion 22B and the pressure receiving surface 30D of the valve opening joint portion 30 contacts each other in a slidable manner along the longitudinal direction shown in the figure.

Widening open passage 30A of the valve opening joint portion 30 communicates with the open passage 26, and the process fluid acting on the pressure receiving surface 30D does not cause the pressure receiving surface 30D to move because the fluid is delivered into the open passage 26.

Therefore, even if the engagement portion 22B supported by the bellows 22A becomes eccentric, the pressure receiving surface 30D is allowed to slide and no unwanted force is exerted to the pressure sensing rod 20 during the operation of the rod 20, hence a good response of the pressure sensing rod 20. In addition, the guide surface 22C of the engagement portion 22B and the sliding surface 30B of the valve opening joint portion 30 retain a certain clearance therebetween, and this simplifies the assembly of the pressure sensing device 22, the pressure sensing rod 20, etc.

Other parts of the capacity control valve 1 in FIG. 14 are more or less the same as the capacity control valve 1 in FIG. 10 as indicated by the same numbers.

In the capacity control valve 1 constructed according to the above descriptions, assuming that Ab=As holds with respect to the effective pressure receiving area Ab of the pressure sensing device 22 and the seal pressure receiving area As of the valve face 21A, a relation formula of the individual urging forces generated by the springs disposed and the balancing forces due to the pressures exerted by the process fluid is given by:

$$Ps \times Ar2 + Pd(As - Ar2) = Fb + S1 - Fsol.$$

If the effective pressure receiving area Ab of the pressure sensing device 22 and the seal pressure receiving area As of the valve face 21A are arranged equal or nearly equal, only two kinds of pressures act on the valve body 21 in the capacity control valve 1, the suction pressure Ps delivered through the detection communication passage 10 and the control pressure Pd coming through the first communication passage 8. As the suction pressure Ps can modulate the control chamber pressure Pc with Ps being complimented by the control pressure Pd, the control precision will be improved as a consequence.

In the aforementioned first embodiment through ninth embodiment, since the open chamber 32 is formed at the connecting portion between the pressure sensing rod 20 and the pressure sensing device 22, in which the pressure receiving surface 30D of the valve opening joint portion 30 and the seat face 22D of the engagement portion 22B are in a slidable contact relation, the contact between the valve opening joint portion 30 and the engagement portion 22B can be quickly disengaged when the valve body 21 rapidly opens. The control chamber 55 is set to a preset pressure by introducing fluid under the discharge pressure Pd into the control chamber 55 via a valve hole 5 after the valve body 21 disengages from the valve seat 6A. At the same time, a flow from the capacity chamber 4 into the detection communication chamber 10 is effectively avoided by means of a sealing contact valve defined by the sliding surface 30B of the valve opening joint portion 30 and the guide surface 22C or the second valve 24A, 51D disposed midway to the open passage 26. Furthermore, even without the open passage 26, the valve opening joint portion 30 and the engagement portion can easily be disengaged so as to effectively prevent the fluid from being introduced from the capacity chamber 4 into the detection communication chamber 10.

Next, the capacity control valve 1 of the present invention can be utilized in pneumatic machinery such as air pumps, compressors, etc. Here an application of the valve to a variable displacement compressor is presented.

Figure 6:
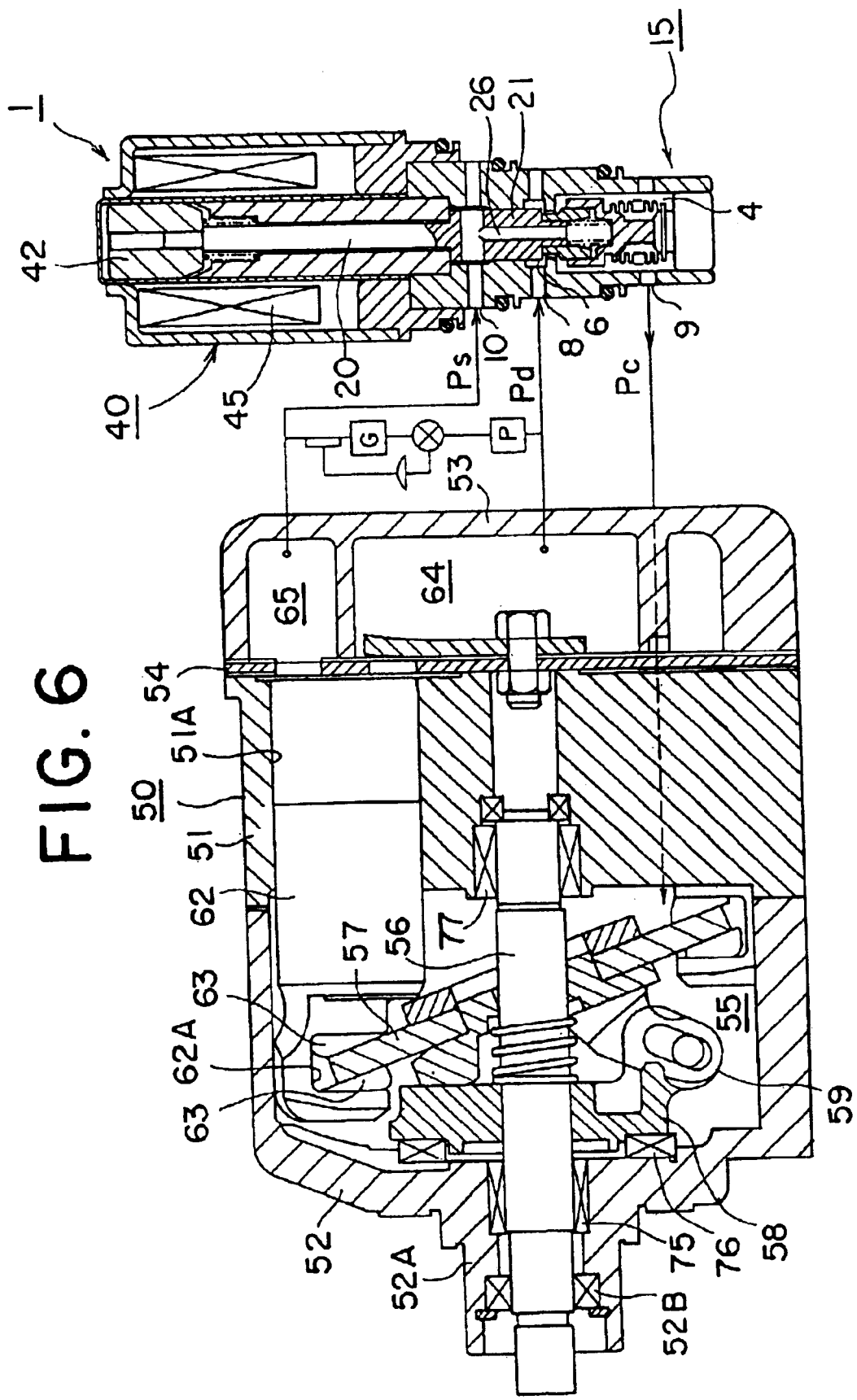
FIG. 6 is a cross sectional view showing the pipe arrangement between a variable displacement compressor and a capacity control valve relative to the present invention.

FIG. 6 is a cross-sectional schematic which shows the relation of the variable displacement compressor 10 and the capacity control valve 1, where the capacity control valve 1 has the same constitution as those previously explained in FIG. 1, FIG. 4 and FIG. 5.

Variable displacement compressor 10 in FIG. 6 retains a housing which comprises a cylinder block 51 disposing a plurality of cylinder bore 51A therein, a front housing 52 being located adjacent one end of the cylinder block 51, and a rear housing 53 being connected via a valve plate 54 to the rear housing 53.

This housing retains a crank chamber 55 defined between the cylinder block 51 and the front housing 52. The crank chamber 55 disposes a longitudinally extending shaft 56 therein. A swash plate 57 is connected via a joint portion 59 with a rotor 58 which is securely fixed to the shaft 56 so that the inclined angle of the swash plate 57 relative to the shaft 56 can be changed. Side face of the rotor 58 is supported by a bearing 76.

One end of the shaft 56 extends to an external through a boss 52A which protrudes to the outside of the front housing 52. A seal portion 52B is disposed at the inner diameter surface of the boss 52A. The seal portion 52B securely seals the crank chamber 55.

A bearing 75 is disposed between one end of the shaft 56 and the boss 52A while another bearing 77 is located at the other end of the shaft 56. These bearings 75, 77 support the shaft 56 in a rotatable manner. The other end of the shaft 56 is located within the cylinder block 51.

A plurality of equally spaced cylinder bores 51A retain their respective pistons 62 therein. The piston 62 then has a concave portion 62A at its one end. The outer circumferential portion of the swash plate 57 is connected in a slidable manner via a shoe 63 which is disposed within the concave portion 62A of the piston 62. The swash plate 57 and the joint portion 59 are connected via a link mechanism so as to rotate together. The piston 62 and the swash plate 57 constitute a link mechanism for a joint motion.

Within the rear housing 53, a discharge chamber 64 and a suction chamber 65 are separately located. Suction chamber 65 and the cylinder bore 51A communicate with each other via a suction valve which is disposed in the valve plate 54. Discharge chamber 64 and the cylinder bore 51A communicate with each other via a discharge valve which also is located in the valve plate 54.

In the arrangement of a variable displacement compressor 50 and a capacity control valve 1 disposed therewith, since the swash plate 57 rotates with the rotor 58, the piston 63 makes a reciprocal motion as the inclined angle of the swash plate 57 varies. Gaseous refrigerant discharged from the discharge chamber 64 in accordance with the reciprocal motion of the piston 63 is provided with from a condenser P via an expansion valve into an evaporator G, and is fed back to the suction chamber 65 after undertaking a specified cooling operation.

Example of the operation of the capacity control valve 1 connected with the variable displacement compressor 50 is described now.

Suppose the discharge pressure (control pressure) Pd is constant. If the suction pressure Ps is below the control point (set suction pressure Psi), assuming that the effective pressure receiving area Ab of the pressure sensing device 22, the seal pressure receiving area As of the valve face 21A and the pressure receiving area Ar2 of the action face 23 are arranged all equal, the valve body 21 disengages from the valve seat 6A according to the spring forces given by the bellows 22A or coil spring 17 of the pressure sensing device 22 which is chosen to give the largest spring force of the all spring biasing means used. The open position of the capacity control valve 1 is illustrated in FIG. 3. When the valve body 21 opens up, the capacity chamber 4 and the valve chamber 6 communicates with each other via the valve hole 5.

In this valve opening operation, fluid in the discharge chamber 64 under the control pressure (discharge pressure) Pd flows into the first communication passage 8. The fluid under the discharge pressure Pd transmitted from the first communication passage 8 into the valve chamber 6 is further transmitted from the valve hole 5 to the capacity chamber 4, then via the second communication passage 9 into the crack chamber 55 while acting on the pressure sensing device 22.

Since the discharge pressure Pd transmitted to the crack chamber 55 causes the pressure of the crank chamber 55 to increase, the increased pressure in the crank chamber 55 then acts on so as to decrease the inclined angle of the swash plate 57 of the variable displacement compressor 50. This leads to decreasing a fluid capacity that is discharged from the piston chamber, therefore the suction pressure Ps is modulated so as to approach the set control point.

If the suction pressure Ps exceeds the control point, since the effective pressure receiving area Ab of the pressure sensing device 22 and the seal pressure receiving area As of the valve face 21A are arranged equal, the forces acting on the pressure receiving areas Ab, As cancel each other and the suction pressure Ps acted on the pressure receiving area Ar2 of the action face 23 causes the valve body 21 to move toward the valve seat 6A in a direction closing the valve and to reduce the flow.

When the valve body 21 is fully closed, the discharge pressure Pd acts on the outer diameter surface of the valve body 21 and exerts no force in a direction opening the valve.

As a consequence, a pressure differential of the suction pressure Ps and the crank chamber pressure Pc in the crank chamber 55 becomes small and, on the contrary to the above mentioned case, the inclined angle of the swash plate 57 of the variable displacement compressor 50 increases and the fluid capacity under the discharge pressure Pd of the variable displacement compressor 50 is modulated to be increased.

Described above is an operation example of the valve body 21 by the suction pressure Ps. A command is transmitted to the solenoid portion 40 from an external computer during operation. The solenoid portion 40 is to be controlled from an external. When the solenoid portion 40 electromagnetically urges the valve body 21 via the solenoid rod 25, a positioning force for the valve body 21 inside the valve chamber 6 is given as a spring force, denoted by Fb, within the pressure sensing device 22 to open up the valve body 21. The suction pressure Ps simultaneously acts on the valve body 21 exerting a force (Ar2×Ps) in a direction closing the valve.

In addition, an electromagnetic force F by the solenoid portion 40 in accordance with the current acts on so as to close the valve body. These three forces determine the actual position of the valve body 21. That is, a valve opening area for capacity control in the capacity control valve 1 is determined.

Since the electromagnetic urging force is electrically controlled from the external, when the capacity control range is exceeded, de-energizing the solenoid portion 40 causes a spring biasing means 28 to quickly open up the valve, hence deactivation of the capacity control. In this case, the fluid under the control pressure (discharge pressure) Pd is transmitted via the capacity chamber 4 from the valve hole 5 to the second communication passage 9. This increases the control chamber pressure (crank chamber pressure) Pc which communicates with the second communication passage 9, which in turn urges the inclined angle of the swash plate 57 to approach zero so that the operation of the piston 62 is halted.

When the valve body 21 opens in the capacity control valve 1, the pressure sensing device 22 is retained under a compressive state due to the high control pressure Pd within the capacity chamber 4 acting on the effective pressure receiving area Ab of the bellows 22A, and a separation of the pressure receiving surface 30D of the valve opening joint portion 30 from the seat face 22D of the engagement portion 22B keeps the valve in its opening position. Under this circumstance, the suction pressure Ps acts on the pressure receiving surface 30D and the action face 23 in opposite directions, therefore its resultant force becomes zero (Ar1= Ar2) and only the solenoid portion 40 acts on the valve body 21. This enables the external force to precisely keep the valve body 21 open. This operation is similar to a clutch disengagement in operation for a rotary shaft 56 of a variable displacement compressor, and this indicates that the capacity control valve 1 can achieve a similar function to a clutchless variable displacement compressor.

In the variable displacement compressor 50 in accordance with the present invention, since the effective pressure receiving area Ab of the pressure sensing device 22 and the seal pressure receiving area As of the valve face 21A or the pressure receiving area Ar2 of the action face 23 are arranged equal or nearly equal, most of the control pressure Pd or/and control chamber pressure Pc is canceled and only a non-canceled portion of the control pressure Pd or/and control chamber pressure Pc works with the suction pressure Ps to execute the capacity control. In addition, arbitrary setting of a control point for the suction pressure Ps by means of the solenoid portion 40 makes possible an accurate control of the gaseous refrigerant in the variable displacement compressor 50.

The capacity control valve includes a small number of parts and its construction is simple enough to reduce the frequency of failure occurrence. In addition, the valve housing 2 and the pressure sensing rod 20 are not only simple in structure and easy for assembly, but also easy to fabricate with high precision. This suits for a mass production of the valve housing 2 and the pressure sensing rod 20 and leads to a realization of low-cost capacity control valve 1.

Further embodiments related to the present invention will be described next.

Capacity control valve according to a second invention comprises a valve opening joint portion 30 disposing a pressure receiving surface 30D and a sliding surface 30B, an engagement portion 22B disposing a seat face 22D making a contact with the pressure receiving surface 30D and a guide surface 22C sealingly fitted to the sliding surface 30B, an open chamber 32 located between the valve opening joint portion 30 and the engagement portion 22B within the contact surface formed by the sliding surface 30B of the valve opening joint portion 30 and the guide surface 22C of the engagement portion 22B, and a open passage 26 communicating with the open chamber 32 and the action chamber 7.

Capacity control valve according to the second invention requires the pressure of the control chamber 55 to be able to be quickly modulated as the control pressure fluid is being controlled by the suction pressure Ps. For this purpose, the valve body 21 with the suction pressure Ps is in charge of a normal capacity and pressure control, and when a fluid pressure load to be controlled is increased, for instance, modulating the solenoid coil based on an external command quickly lifts the valve body 21. Under this circumstance, since the valve opening joint portion 30 and the engagement portion 22B are acted on by fluid pressures and spring biasing means in a complicated manner, a rapid disconnection may exert unwanted loads to the pressure sensing device 22 and the valve body 21. However, owing to the contact manner between the sliding surface 30B and the guide surface 22C as well as the deployment of the open passage 26, the engagement portion 22B, can rapidly be disengaged from each other, in which the engagement portion 22B is integral with the pressure sensing device 22 and the valve opening joint portion 30 is integral with the valve body 21. Therefore the valve body 21 can quickly be lifted from the valve seat 6A.

A joint structure of the valve opening joint portion 30 and the engagement portion 22B, which is located between the pressure sensing device 22 and the valve body 21, is acted on by a fluid pressure. This implies that if the valve body 21 is in action, so is the pressure sensing device 22, and the seat face 22D of the engagement portion 22B and the pressure receiving surface 30D of the pressure sensing device 30 are being pressed against each other so as to act together in a connected manner. Under this circumstance, a sealing relation established by mating the sliding surface 30B with the guide surface 22C shuts off the open chamber 32 against the capacity chamber 4. The open chamber 32 is maintained under the same pressure via the open passage 26 to the suction pressure Ps in the action chamber 7.

When opening the valve body 21 by de-energizing the solenoid portion 40 which is commanded by a computer controller, since the suction pressure of the open passage 26 is acting on the pressure receiving area 30D of the valve opening joint portion 30, the valve opening joint portion 30 can be quickly disengaged from the engagement portion 22B in a direction opening the valve without exerting unwanted forces to the pressure sensing devices 22 and so on. As the result, the valve body 21 can be rapidly opened, and the capacity or pressure in the control chamber 55 can be modulated to a new set value by quickly transmitting the control pressure Pd from the valve hole 5 to the control chamber 55.

Furthermore, since the valve opening joint portion 30 is integral with the valve body 21 within the pressure sensing device 22, a slidable contact of the sliding surface 30B of the valve opening joint portion 30 and the guide surface 22C of the engagement portion 22B insures a valve lifting without the valve body 21 being subject to eccentricity. The valve opening joint portion 30 is located within the capacity chamber 4, and the pressure receiving area of the pressure receiving surface 30D, which is subject to the suction pressure Ps from the open passage 26, can be arranged equal to the pressure receiving area of the action face 23 of the valve body 21 which also is subject to the suction pressure Ps on the opposite side. This arrangement not only makes the entire structure of the valve portion 15 compact, but also makes the valve opening joint portion 30 operate smoothly by the force acting on the pressure receiving surface 30D, which improves the valve lifting response of the valve body 21.

Capacity control valve 1 according to a third invention comprises a protruding portion 30E, a second pressure receiving surface and an open chamber 32 in which the protruding portion 30E is disposed on the pressure receiving surface 30D of the valve opening joint portion 30, the second pressure receiving surface is located at the end face of the protruding portion 30E, and the open chamber 32 is disposed between the second pressure receiving surface and the seat face 22D by mating the pressure receiving surface 30D with the seat face 22D.

In the capacity control valve 1 according to the third invention, the protruding portion 30E on the pressure receiving surface 30D enables it to form a clearance between the pressure receiving surface 30D and the seat face 22D. This helps the suction pressure Ps transmitted from the open passage 26 quickly to act on the pressure receiving surface 30D. As the result, disengagement of the valve opening joint portion 30 from the engagement portion 22B in the lifting of the valve body 21 can be realized quite easily.

Capacity control valve 1 according to a fourth invention comprises a pressure receiving surface 30D in the valve opening joint portion 30, a seat face 22D located in the engagement portion 22B which mates with the pressure receiving surface 30D in a tiltable manner, an open chamber 32 between the valve opening joint portion 30 and the engagement portion 22B inside the mating surface of the pressure receiving surface 30D and the seat face 22D, an open passage 26 communicating with the open chamber 32 and the action chamber 7, and a second valve which shuts off the open passage 26 as soon as the pressure receiving surface 30D disengages from the seat face 22D.

In the capacity control valve 1 according to the fourth invention, since the seat face 22D of the engagement portion 22B, which is supported by the bellows 22A of the pressure sensing device 22, is pressed against the pressure receiving surface 30D of the valve opening joint portion 30 in a tiltable manner, a tilted seat face is able to always retain a sealing contact relation with the pressure receiving surface 30D. As this tiltable contact ensures to provide the valve body 21 with an urging force in an axial direction, a good response for the valve body 21 can be obtained without pressing the operating valve body 21 against the valve housing 2.

In addition, since the valve body 21 and the pressure sensing device 22 form a contact relation under a small contact area of the valve opening joint portion 30 and the engagement portion 22B, assembly of the pressure sensing rod 20, which is integral with the valve body 21, and the pressure sensing device 22 to the valve housing 2 can be simplified. Therefore, assembly precision is enhanced.

Capacity control valve 1 according to a fifth invention has a tapered shape on one of the above pressure receiving surface 30D and the seat face 22D as well as a shape of cross-sectional circular arc on the other.

In the capacity control valve 1 according to the fifth invention, a relative tilting between the valve opening joint portion 30 and the engagement portion 22B is tolerated because of its narrow contact width established by the tapered and spherical contact surfaces. Also the contact of the tapered surface and the spherical surface between the valve opening joint portion 30 and the engagement portion 22B makes assembly of the capacity control valve 1 very simple.

In a capacity control valve 1 according to a sixth invention, an engagement portion 22B is separated from a base portion 22D of the pressure sensing device 22 and a division surface 22F1 of the engagement portion 22B makes a contact with a planar division surface 22P1 of the base portion 22D of the pressure sensing device 22.

In the capacity control valve 1 according to the sixth invention, as the engagement portion 22B is separated from the base portion 22D of the pressure sensing device 22, the planar division surface 22P1 of the base portion 22D and the division surface of the engagement portion 22B are slidable along the common surface. Therefore an axial eccentricity between the valve body 21 and the pressure sensing device 22 does not cause an excessive force because a relative sliding movement of the engagement portion 22B and the base portion 22P along the common division surface can tolerate the eccentricity. The pressure sensing rod which is integral with the valve body 21 can reduce a friction against the valve housing 2 and hence an enhanced response. In addition, assembly of the pressure sensing rod 20 integral with the valve body 21 and the pressure sensing device 22 becomes extremely easy. Assembly precision is also improved, accordingly.

Capacity control valve 1 according to a seventh invention retains an open passage 22H1 in the engagement portion 22B which communicates with the open chamber 32 and the division surfaces.

In the capacity control valve 1 according to the seventh invention, since the open passage 22H1, 22H2 is disposed in the engagement portion 22B so as to communicate with the open chamber 32 and the division surfaces 22F1, accumulation of the fluid pressure at the division surfaces within the capacity chamber 4, which is likely to cause unwanted forces to the valve body 21, can be prevented. This is done by transmitting the accumulating fluid pressure at the division surfaces via the open passage 22H1, 22H2 into the action chamber 7. Therefore, a potential bad influence on the valve body 21 in action by an unwanted movement of the engagement portion 22B caused by the accumulating fluid pressure within the capacity chamber 4 can be effectively avoided.

In a capacity control valve 1 according to an eighth invention, a seat face 22D of the engagement portion 22B has a planar surface, and the surface mates with a pressure receiving surface 30D of the valve opening joint portion 30 by the common planar surface in a sealing relation.

In the capacity control valve 1 according to the eighth invention, as the pressure receiving surface 30D of the valve opening joint portion 30 and the seat face 22D of the engagement portion 22B form a sealing contact at the common planar surface, a potential bad influence over the valve action given by an axial eccentricity between the engagement portion 22B supported by the flexible bellows 22A of the pressure sensing device 22 and the valve body 21 will be effectively prevented. Mating of the joint surfaces of the pressure sensing device 22 side and the valve body 21 side at a common surface substantially simplifies the assembly of the pressure sensing device 22 and the valve body 21 to the valve housing 2. Also since the pressure receiving surface 30D of the valve opening joint portion 30 and the seat face 22D of the engagement portion 22B are merely in a sealing contact relation at the common planar surface, it is also easy to disengage these contact surfaces.

Capacity control valve 1 according to a ninth invention retains a spring biasing means 33 within the open chamber 32 which exerts biasing forces against the valve opening joint portion 30 and the engagement portion 22B in opposite directions.

In the capacity control valve 1 according to the ninth invention, since the spring biasing means 33, for example a preloaded compression spring, located within the open chamber 32 provides with mutually opposite urging forces to the valve opening joint portion 30 and the engagement portion 22B, disengagement of the valve opening joint portion 30 and the engagement portion 22B in valve opening action can be made quite easy.

In particular, if the pressure receiving area 30D of the valve body 21 and that of the action face 23 are arranged equal, then the fluid pressure acting on the pressure receiving area 30D and the action face 23 exerts mutually canceling forces and a choice of the spring biasing means 33 will arbitrarily determine the disengagement speed of the valve opening joint portion 30. This makes a design modification of the set value easy.

Capacity control valve 1 according to a tenth invention retains an integral structure of the valve body 21 and the pressure sensing rod 20, an open passage 26 in the pressure sensing rod 20 which communicates with the detection communication passage 10, and a second valve face 24 of a second valve in the pressure sensing rod 20 which shuts off the open passage 26 when the valve body 21 is in its open position.

In the capacity control valve 1 according to the tenth invention, since the open passage 26 and the second valve face 24 are disposed in the pressure sensing rod 20 where the second valve face 24 shuts off the open passage 26 when the valve body 21 is opened, the second valve face 24 can be closed at the same time when the valve body 21 is opened. This effectively prevents control chamber Pc pressure fluid or discharge pressure Pd fluid from being transmitted via the open passage 26 into the detection communication passage 10. As the result, this helps to avoid a possible failure caused by an excessive pressure in the suction chamber 65 or control chamber 55.

Capacity control valve 1 according to an eleventh invention retains an elastically impinging means 17 in the pressure sensing device 22 which urges the valve body 21 in a direction opening the valve body 21.

In the capacity control valve 1 according to the eleventh invention, since the elastically impinging means 17 urging the valve body 21 toward its opening direction may be disposed inside or outside of the bellows 22A within the capacity chamber 4, adoption of the elastically impinging means 17 makes the pressure sensing device 22 more compact. Also as the impinging means 17 works at the same location as the bellows 22A does, the valve body 21 and the engagement portion 22B are biased in an axial direction by the impinging means 17 without eccentricity. This helps to improve the response in a valve opening action or closing action. This also can avoid a possible wear caused by eccentricity.

Capacity control valve 1 according to a twelfth invention arranges the effective pressure receiving area of the pressure sensing device 22 and the seal pressure receiving area formed by the contact between the valve face 21A of the valve body 21 and the valve seat 6A equal or nearly equal.

In the capacity control valve 1 according to the twelfth invention, an equilibrium equation for the forces acting on various pressure receiving areas including the valve body 21 of the capacity control valve 1 is given by:

$$Pc(Ab-Ar1)+Pc(Ar1-As)+Ps \times Ar1+Ps(Ar2-Ar1)+Pd(As-Ar2)=Fb+S1-Fsol.$$

Rearranging the equation gives $$Pc(Ab-As)+Pd(As-Ar2)+Ps \times Ar2=Fb+S1-Fsol.$$

If the effective pressure receiving area Ab of the pressure sensing device 22 and the seal pressure receiving area As defined by the valve face 21A of the valve body 21 contacting with the valve seat 6A are arranged equal or nearly equal (Ab=As), the above equation becomes:

$Ps \times Ar2+Pd(As-Ar2)=Fb+S1-Fsol$. As the result, the control chamber pressure (crank chamber pressure) Pc is offset on the pressure receiving surfaces 30D being acted on via valve hole 5 and Pc is discarded from the balance of forces acted on individual pressure receiving surfaces. Therefore the control chamber pressure Pc can be disregarded form the control of capacity control valve 1. That is, the valve body 21 action is made insensitive to the control chamber pressure Pc and being able to adjust control with the control pressure Pd alone will improve its control performance.

When the control chamber pressure Pc reaches an extreme maximum, the valve body 21 can be quickly opened by means of the solenoid portion 40 so as to switch the control pressure Pd. For instance, the operation of the variable displacement compressor can be functionally suspended when a cooling load for a variable displacement compressor in an air-conditioning machine becomes heavy. This implies that the variable displacement compressor does not require a clutch.

Capacity control valve 1 according to a thirteenth invention arranges the effective pressure receiving area of the pressure sensing device 22, the seal pressure receiving area defined by the contact between the valve face 21A of the valve body 21 and the valve seat 6A, and the pressure receiving area of the action face 23, all equal or nearly equal.

In the capacity control valve 1 according to the thirteenth invention, an equilibrium equation for the forces acting on various pressure receiving areas including the pressure sensing device 22 and the action face 23 of the valve body 21 is given by:

$$Pc(Ab-Ar1)+Pc(Ar1-As)+Ps \times Ar1+Ps(Ar2-Ar1)+Pd(As-Ar2)=Fb+S1-Fsol.$$

Rearranging the equation gives $$Pc(Ab-As)+Pd(As-Ar2)+Ps \times Ar2=Fb+S1-Fsol.$$

If the effective pressure receiving area Ab of the pressure sensing device 22, the seal pressure receiving area As defined by the contact of the valve face 21A and the valve seat 6A, and the pressure receiving area Ar2 of the action face 23 are arranged equal or nearly equal (Ab=As=Ar2), the above equation becomes:

$Ps \times Ar2=Fb+S1-Fsol$. As the equation implies, individual forces due to the control chamber pressure Pc and the control pressure Pd acting on the pressure receiving surfaces via valve hole 5 cancel with each other, and the resulting force exerted to the valve body 21 by the control pressure Pd and the control chamber pressure Pc ends up with zero.

In the capacity control valve 1, the suction pressure Ps acts on the effective pressure receiving area on the back face of the valve body 21 according to the balance of the forces being acted on individual pressure receiving surfaces, and the operation of the valve body 21 without influence of the control pressure Pd and the control chamber pressure Pc insures an accurate control.

In addition, when the control chamber pressure Pc reaches an extreme maximum, the second valve body 24 can be quickly opened by means of the solenoid portion 40 so as to switch the control pressure Pd. For instance, the operation of the variable displacement compressor can be functionally suspended when a cooling load for a variable displacement compressor in an air-conditioning machine becomes heavy. Therefore the variable displacement compressor can omit a clutch and this leads to a reduced production cost.

Capacity control valve according to a fourteenth invention arranges the seal pressure receiving area defined by the contact between the valve face of the valve body and the valve seat and the pressure receiving area of the action face equal or nearly equal.

In the capacity control valve 1 according to the fourteenth invention, an equilibrium equation for the forces acting on various pressure receiving areas including the pressure sensing device 22 and the action face 23 of the valve body 21 is given by:

$$Pc(Ab-Ar1)+Ps\times Ar1+Pc(Ar1-As)+Ps(Ar2-Ar1)+Pd(As-Ar2)=Fb+S1-Fsol.$$

Rearranging the equation gives $$Pc(Ab-As)+Pd(As-Ar2)+Ps\times Ar2=Fb+S1-Fsol.$$

If the seal pressure receiving area As formed by the contact of the valve face 21A and the valve seat 6A and the pressure receiving area Ar2 of the action face 23 of the valve body 21 are arranged equal or nearly equal (As=Ar2), the above equation becomes:
$Pc(Ab-As)+Ps\times Ar2=Fb+S1-Fsol$. As the equation implies, individual forces due to the control pressure Pd acting on the pressure receiving surfaces via valve hole 5 cancel with each other, and the resulting force exerted to the valve body 21 by the control pressure Pd ends up with zero. That is, control under the suction pressure Ps takes place while being compensated by the control chamber pressure Pc, but without being affected by the control pressure Pd.

When the control chamber pressure Pc exceeds a set range (for example, when an extreme maximum is reached), the control chamber 55 pressure Pd can easily be modified by quickly disengaging the valve opening joint portion 30 from the engagement portion 22B via the solenoid portion 40. For instance, the operation of the variable displacement compressor can be functionally suspended when a cooling load for a variable displacement compressor in an air-conditioning machine becomes heavy. Therefore the variable displacement compressor can omit a clutch and this leads to a reduced production cost.

Capacity control valve 1 according to a fifteenth invention arranges the pressure receiving area of the pressure receiving surface 30D of the valve opening joint portion 30 and the action face 23 equal or nearly equal.

In the capacity control valve 1 according to the fifteenth invention, as the pressure receiving areas of the pressure receiving surface 30D of the valve opening joint portion 30 and the action face 23 are arranged equal or nearly equal and the suction pressure Ps acts on the pressure receiving surface 30D and the action face 23 via open passage 26 from the opposite directions with the same magnitude of force, the valve body 21 is guaranteed a set valve lifting speed with a spring biasing (elastically impinging) means 33 without being affected by a disturbing external force during the valve opening joint portion 30 in action.

Advantages of the present invention relative to preferred embodiments will be described now.

According to the present invention of capacity control valve, the connection of the valve opening joint portion and the engagement portion is located between the pressure sensing device and the valve body. When the valve body is in action, the valve lift is controlled based on the balance of a force in accordance with the current supplied to the solenoid coil and the process fluid pressure. Seat face of the engagement portion and the pressure receiving surface of the valve opening joint portion are connected with each other under this circumstance.

The seat face of the engagement portion and the pressure receiving surface of the pressure sensing device form a contact by being pressed against each other. Therefore, when the valve body is quickly opened by the solenoid coil commanded from an external computer controller which is not shown in the figure, the connection of the engagement portion and the valve opening joint portion also can be disengaged according to the valve lifting speed. As a resultant advantage, a rapid opening of the valve body makes the control pressure quickly be discharged to the control chamber for modifying the desired value of capacity or pressure of the control chamber which is to be controlled.

According to the present invention of capacity control valve, a sliding surface of the engagement portion mates with a guide surface of the valve opening joint portion in a sealing relation and an open chamber is established therewithin, and the valve face is connected with the pressure receiving surface. The open chamber communicates with the action chamber via open passage, and in case that the valve body should quickly be opened, the valve opening joint portion can be rapidly disengaged from the engagement portion by the suction pressure expanding the open chamber.

This not only makes a normal capacity or pressure control accurate, but also, in case of an increased fluid pressure load, quickly disengages the valve opening joint portion from the engagement portion by de-exciting the solenoid coil and modulates the capacity or pressure of the control chamber. Application of this capacity control valve to a variable displacement compressor yields a clutchless variable displacement compressor by which its performance is improved as well as its production cost is reduced.

According to the present invention of capacity control valve, the valve opening joint portion disposes a protruding portion at its pressure receiving surface and the protruding portion locates a second pressure receiving surface at its end which mates with the seat face of the engagement portion. Since an open chamber is formed between the pressure receiving surface and the seat face, a fluid pressure from the open passage is kept acting on. This enables it to quickly disengage the valve opening joint portion from the engagement portion, hence a rapid valve lifting.

According to the present invention of capacity control valve, a control chamber pressure (crank chamber pressure) is offset on pressure receiving surfaces and is discarded from the balance of forces acting on the operation mechanism of the pressure receiving surfaces. This leads to a capacity control valve which realizes a high accuracy control using the suction pressure but discarding the control pressure.

In case of modulating the control pressure with the suction pressure, if the control chamber pressure goes out of the set range, for instance, the pressure needs to be modulated in a rapid manner. For this reason, this control valve not only makes a normal capacity or pressure control accurate, but also, in case of an increased fluid pressure load, quickly disengages the valve opening joint portion from the engagement portion by de-exciting the solenoid coil and modulates the capacity or pressure of the control chamber.

According to the present invention of capacity control valve, individual forces due to the control chamber pressure and the control pressure acting on the pressure receiving surfaces via valve hole cancel with each other, and the resultant force exerted to the valve body by the control pressure and the control chamber pressure ends up with zero. Therefore, an accurate control without the influence of the control pressure and the control chamber pressure is realized when the action face is acted on by the suction pressure.

When the control chamber pressure reaches an extreme maximum, the valve opening joint portion can be quickly disengaged from the engagement portion via the solenoid portion and the valve's open position is maintained even if the valve body is acted on by pressures. This enables the control pressure to be modulated easily. For instance, the operation of the variable displacement compressor can be functionally suspended when a cooling load for a variable displacement compressor in an air-conditioning machine becomes heavy. Therefore the variable displacement compressor can omit a clutch and this leads to a reduced production cost.

According to the present invention of capacity control valve, individual forces due to the control chamber pressure acting on the pressure receiving surfaces cancel with each other, and the resultant force exerted to the valve body by the control pressure ends up with zero. Therefore, an accurate control without the influence of the control pressure is realized when the action face is acted on by the suction pressure.

When the control chamber pressure reaches an extreme maximum, the valve opening joint portion can be quickly disengaged from the engagement portion via the solenoid portion and the valve's open position is maintained. This enables the control pressure to be modulated easily. For instance, the operation of the variable displacement compressor can be functionally altered or suspended when a cooling load for a variable displacement compressor in an air-conditioning machine becomes heavy. Therefore the variable displacement compressor can be controlled in a clutchless manner, and cost for peripheral accommodations will be reduced.

Also according to the present invention of capacity control valve, since the pressure receiving area of the pressure receiving surface of the valve opening joint portion and the action face are arranged equal or nearly equal, the suction pressure acts on the pressure receiving surface and the action face via open passage from the opposite directions with the same magnitude of force, the valve body is guaranteed during the valve opening joint portion in action a desired valve lifting speed determined by an elastically impinging means without being affected by a disturbing external force.

Having described specific embodiments of the invention, however, the descriptions of these embodiments do not cover the whole scope of the present invention nor do they limit the invention to the aspects disclosed herein, and therefore it is apparent that various changes or modifications may be made from these embodiments.

The technical scope of the invention is specified by the claims.

What is claimed is:

1. A capacity control valve for modulating a capacity or pressure of a control chamber by controlling the opening degree of a valve portion to deliver a control pressure fluid, said control valve comprising:

a capacity chamber disposed in said valve portion for communicating with a second communication passage;

a valve chamber which retains a valve seat for a valve hole and communicates with a first communication passage;

an action chamber which communicates with a detection communication passage as well as said valve chamber;

an action face disposed in said action chamber, the action face retaining a pressure receiving area on which a suction pressure supplied from said detection communication passage acts;

a valve body integral with said action face and disposed in a movable manner within said valve chamber, the valve body retaining a valve face that can be freely attached to or detached from said valve seat;

a valve opening joint portion integral with said valve body and retaining a pressure receiving surface;

an engagement portion forming an annular contact with said pressure receiving surface of said valve opening joint portion, the engagement portion being disengaged from said pressure receiving surface when said valve body opens;

a pressure sensing device retaining said engagement portion at its one end, the pressure sensing device being disposed within said capacity chamber and exerting an urging force to said valve body in an direction opening said valve body by receiving a process fluid pressure on an effective pressure receiving area within said capacity chamber; and a solenoid portion urging a solenoid rod to move in a direction opening or closing said valve body, the solenoid rod being connected to said valve body and retaining a plunger.

2. The capacity control valve according to claim 1, wherein said valve opening joint portion retains a pressure receiving surface and a sliding surface, wherein said engagement portion retains a seat face contacting said pressure receiving surface and a guide surface forming a sealing contact with said sliding surface, wherein an open chamber is disposed between said valve opening joint portion and said engagement portion inside a mating surface formed by said sliding surface of said valve opening joint portion and said guide surface of said engagement portion, and wherein an open passage is disposed and said open passage communicates with said open chamber and said action chamber.

3. The capacity control valve according to claim 2, wherein a protruding portion is disposed on said pressure receiving surface of said valve opening joint portion, wherein a second pressure receiving surface is disposed at the end face of said protruding portion in which said second pressure receiving surface mates with said seat face of said engagement portion, and wherein the contact of said second pressure receiving surface and said seat face forms said open chamber between said pressure receiving surface and said seat face.

4. The capacity control valve according to claim 1, wherein a pressure receiving surface is disposed in said valve opening joint portion, wherein said engagement portion retains a seat face contacting said pressure receiving surface in a tiltable manner, wherein an open chamber is disposed between said valve opening joint portion and said engagement portion inside a mating surface formed by said pressure receiving surface and said seat face, wherein an open passage is disposed and said open passage communicates with said open chamber and said action chamber, and wherein a second valve is formed and said second valve closes said open passage as soon as said pressure receiving surface separates from said seat face.

5. The capacity control valve according to claim 1, wherein one of said pressure receiving surface and said seat face has a tapered form while the other has a circular arc cross-section, and said pressure receiving surface and said seat face contact each other.

6. The capacity control valve according to claim 1, wherein said engagement portion is divided from a base portion of said pressure sensing device, wherein a division surface of said engagement portion contacts a planar division surface of said base portion of said pressure sensing device.

7. The capacity control valve according to claim 6 further includes an open passage, wherein said open passage directly communicates with said open chamber and inside said division surface.

8. The capacity control valve according to claim 1, wherein said seat face is formed plane, wherein said pressure receiving surface of said valve opening joint portion and said seat face of said engagement portion sealingly contact with each other by the common plane surface.

9. The capacity control valve according to claim 1 further includes a spring biasing means, wherein said spring biasing means urges said valve opening joint portion and said engagement portion in mutually opposite directions.

10. The capacity control valve according to claim 1, wherein a pressure sensing rod integral with said valve body retains an open passage, and the open passage communicates with said detection communication passage, wherein said pressure sensing rod has a second valve face of a second valve, and the second valve closes said open passage when the valve body opens.

11. The capacity control valve according to claim 1, wherein said pressure sensing device retains an elastically impinging means, wherein the elastically impinging means urges said valve body in a direction opening said valve body.

12. The capacity control valve according to claim 1, wherein an effective pressure receiving area of said pressure sensing device and a seal pressure receiving area defined by the contact of a valve face of said valve body and a valve seat are arranged equal or nearly equal.

13. The capacity control valve according to claim 1, wherein an effective pressure receiving area of said pressure sensing device, a seal pressure receiving area defined by the contact of a valve face of said valve body and a valve seat, and a pressure receiving area of said action face are arranged equal or nearly equal.

14. The capacity control valve according to claim 1, wherein a seal pressure receiving area defined by the contact of a valve face of said valve body and a valve seat and a pressure receiving area of said action face are arranged equal or nearly equal.

15. The capacity control valve according to claim 1, wherein a pressure receiving area of said pressure receiving surface of said valve opening joint portion and a pressure receiving area of said action face are arranged equal or nearly equal.

* * * * *